(12) United States Patent
Mitchell et al.

(10) Patent No.: US 9,464,001 B2
(45) Date of Patent: Oct. 11, 2016

(54) ENGINEERED AGGREGATES FOR METAMATERIALS

(71) Applicant: California Institute of Technology, Pasadena, CA (US)

(72) Inventors: Stephanie Mitchell, Pasadena, CA (US); Anna Pandolfi, Pasadena, CA (US); Michael Ortiz, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/308,347

(22) Filed: Jun. 18, 2014

(65) Prior Publication Data

US 2014/0371353 A1    Dec. 18, 2014

Related U.S. Application Data

(60) Provisional application No. 61/836,292, filed on Jun. 18, 2013.

(51) Int. Cl.

| | |
|---|---|
| *C04B 14/34* | (2006.01) |
| *C04B 28/02* | (2006.01) |
| *C04B 14/32* | (2006.01) |
| *G10K 11/165* | (2006.01) |
| C04B 111/20 | (2006.01) |
| E04B 1/98 | (2006.01) |
| E04H 9/02 | (2006.01) |

(52) U.S. Cl.
CPC ............ *C04B 14/34* (2013.01); *C04B 14/322* (2013.01); *C04B 28/02* (2013.01); *G10K 11/165* (2013.01); *C04B 2111/2046* (2013.01); *E04B 1/985* (2013.01); *E04H 9/021* (2013.01)

(58) Field of Classification Search
CPC ...... C04B 14/34; C04B 14/322; C04B 28/02; G10K 11/165
See application file for complete search history.

(56) References Cited

PUBLICATIONS

Brun et al., "Achieving control of in-plane elastic waves", Applied Physics Letters, 2009, vol. 94, pp. 061903-1-061903-3.
Goffaux et al., "Two-dimensional phononic crystals studied using a variational method: Application to lattices of locally resonant materials", Physical Review B, 2003, vol. 67, pp. 144301-1-144301-10.
Hirsekorn, "Small-size sonic crystals with strong attenuation bands in the audible frequency range", Applied Physics Letter, 2004, vol. 84, pp. 3364-3366.
Jensen et al., "Phononic band gaps and vibrations in one- and two-dimensional mass-spring structures", Journal of Sound and Vibration, 2003, vol. 266, pp. 1053-0178.

(Continued)

*Primary Examiner* — John Uselding
(74) *Attorney, Agent, or Firm* — KPPB LLP

(57) ABSTRACT

Materials and methods for implementing engineered aggregates in metamaterials are provided. The engineered aggregates may be tuned to oscillate resonantly under the influence of an external force improving the dynamic performance of the metamaterial by impeding dynamic excitation. The engineered aggregate generally comprise a multilayer resonant structure having at least a relatively heavy inner core surrounded by at least a compliant coating layer. The geometry and stiffness of the relative layers can be tuned to engineer a desired resonant frequency response within the aggregate for a chosen frequency range. The engineered aggregates are disposed in a matrix material to form a metamaterial. The engineered aggregates may be disposed within a mortar matrix to form a concrete metamaterial suitable for use, for example, in structural applications, including bunkers, shelters, etc.

12 Claims, 20 Drawing Sheets

(56) References Cited

PUBLICATIONS

Klironomos et al., "Elastic Wave Band Gaps and Single Scattering", Solid State Communications, 1998, vol. 105, No. 5, pp. 327-332.

Kundtz et al., "Extreme-angle broadband metamaterial lens", Letters, Nature Materials, Feb. 2010, vol. 9, pp. 129-132.

Kushwaha et al., "Acoustic Band Structure of Periodic Elastic Composites", Physical Review Letters, Sep. 27, 1993, vol. 71, No. 13, pp. 2022-2025.

Liu et al., "An elastic metamaterial with simultaneously negative mass density and bulk modulus", Applied Physics Letters, 2011, vol. 98, pp. 251907-1-251907-3.

Liu et al., "Locally Resonant Sonic Materials", Science, Sep. 8, 2000. vol. 289, pp. 1734-1736.

Liu et al., "Multi-displacement microstructure continuum modeling of anisotropic elastic metamaterials", Wave Motion, 2012, vol. 49, pp. 411-426.

Liu et al., "Three-component elastic wave band-gap material", Physical Review B., vol. 65, pp. 165116-1-165116-6.

Mei et al., "Effects of Mass Density of Fluid-Solid Composites", Physical Review Letters, Jan. 20, 2006, pp. 024301-1-024301-4.

Milton, "New metamaterials with macroscopic behavior outside that of continuum elastodynamics", New Journal of Physics, 2007, vol. 9, 13 pgs.

Milton et al., "On cloaking for elasticity and physical equations with a transformation invariant form", New Journal of Physics, 2006, vol. 8, 20 pgs.

Milton et al., "On modifications of Newton's second law and linear continuum elastodynamics", Proceedings of the Royal Society, 2007, vol. 463, pp. 855-880.

Pendry, "Negative Refraction Makes a Perfect Lens", Physical Review Letters, Oct. 30, 2000, vol. 85, No. 18, pp. 3966-3969.

Psarobas et al., "Scattering of elastic waves by periodic arrays of spherical bodies", Physical Review B, Jul. 1, 2000. vol. 62, No. 1, pp. 278-291.

Sheng et al., "Dynamic mass density and acoustic metamaterials", Physica B, 2007, vol. 394, pp. 256-261.

Sheng et al., "Locally resonant sonic materials", Physica B, 2003, vol. 338, pp. 201-205.

Wang et al., "Lumped-mass method for the study of ban structure in two-dimensional phononic crystals", Physical Review B, 2004, vol. 69, pp. 184302-1-184302-6.

Wang et al., "One-dimensional phononic crystals with locally resonant structures", Physic Letter A, 2004, vol. 327, pp. 512-521.

Wang et al., "Quasi-One-Dimensional Periodic Structure with Locally Resonant Band Gap", Journal of Applied Mechanics, Jan. 2006, vol. 73, pp. 167-170.

Wang et al., "Two-Dimensional Locally Resonant Phononic Crystals with Binary Structures", Physical Review Letters, Oct. 8, 2004, vol. 93, No. 5, pp. 154302-1-154302-4.

Xiao et al., "Longitudinal wave band gaps in metamaterial-based elastic rods containing multi-degree-of-freedom resonators", New Journal of Physics, 2012, vol. 14, 20 pgs.

Zhu et al., "Microstructure continuum modeling of an elastic metamaterial", International Journal of Engineering Science, 2011, vol. 49, pp. 1477-1485.

ENGINEERED AGGREGATES FOR METAMATERIALS

CROSS-REFERENCE TO RELATED APPLICATIONS

This application claims priority to U.S. Provisional Patent Application No. 61/836,292, filed Jun. 18, 2013, the disclosure of which is incorporated herein by reference.

STATEMENT OF FEDERAL FUNDING

This invention was made with government support under Grant No. FA9550-12-1-0091 awarded by the U.S. Department of the Air Force. The government has certain rights in the invention.

TECHNICAL FIELD

The present disclosure is directed to engineered aggregates for composite materials; and more particularly to engineered aggregates adapted to enhance the dynamic performance of metamaterials, and metamaterial systems formed of such engineered aggregates.

BACKGROUND OF THE DISCLOSURE

Metamaterials are engineered materials or complex composites that gain their properties not from the chemical composition of their components, but instead from the design of their microstructure. Metamaterials can be designed to display unusual material behavior when subject to electromagnetic, acoustic, or elastic waves. They may exhibit properties such as negative refractive index, negative bulk modulus, or negative mass; properties which are desirable for many engineering purposes but not typically observable in materials found in nature. The unique properties of metamaterials are often gained through the use of inclusions and structural features.

Sonic or phononic metamaterials are an example of such a material, and have been developed for the manipulation of acoustic waves. When these periodic composite materials interact with acoustic waves, they exhibit wave filtering behavior, creating band gaps or stop bands within the frequency spectrum. Within the band gap frequency range, the applied acoustic waves cannot propagate and the incident energy is dispersed or scattered from the medium.

SUMMARY OF THE INVENTION

The present disclosure provides embodiments directed to materials and methods for implementing engineered aggregates for the production of a new class of metamaterials and metamaterial systems.

In many embodiments the materials and methods are directed to an engineered aggregate including a geometric multilayer body comprising at least an inner core surrounded by a compliant layer, wherein the inner core is formed of a core material having a high mass density relative to the compliant layer, and wherein the compliant layer is formed of a compliant material having an elastic modulus adapted to induce a kinetic oscillation in the inner core when exposed to an energy wave that imparts mechanical energy to the geometric multilayer body within at least one target frequency range, such that the engineered aggregate exhibits a negative effective mass to trap at least a portion of the mechanical energy of the energy wave within the engineered aggregate.

In other embodiments the geometric multilayer body is spherical.

In still other embodiments the core material is selected from the group consisting of steel, tin, brass, nickel, iron, lead, gold, and tungsten carbide.

In yet other embodiments the core material has a density of at least 10000 kg/m$^3$.

In still yet other embodiments the compliant material is selected from the group consisting of silicon, rubber, polyethylene, polypropylene, polystyrene and nylon.

In still yet other embodiments the compliant material has an elastic modulus of at least 1 GPa.

In still yet other embodiments the core material is lead and the compliant material is nylon.

In still yet other embodiments the engineered aggregate includes at least one outer protective layer disposed atop the compliant coating.

In still yet other embodiments the target frequency at which the geometric multilayer body exhibits negative effective mass is dependent on the elastic modulus of the compliant material and the size of the geometric multilayer body in accordance with the following expression:

$$\omega^2 = 3/2 \cdot E_s / (R_I t \rho_I)$$

where $E_s$ is the elastic modulus of the compliant material, $R_I$ is the radius of the inner core, $t$ is the thickness of the compliant layer, $\rho_I$ is the density of the core material and $\omega$ is the target frequency.

In many other embodiments the methods and materials are directed to a structural metamaterial including:
- a matrix formed of a matrix material having a matrix density; and
- a plurality of engineered aggregates each formed of a geometric multilayer body disposed within the matrix material, each geometric multilayer body comprising at least an inner core surrounded by a compliant layer, wherein the inner core is formed of a core material having a core density, and wherein the compliant layer is formed of a compliant material having a compliant layer density that is lower than both the matrix density and the core density, and an elastic modulus adapted to induce a kinetic oscillation in the inner core when exposed to an energy wave that imparts mechanical energy to the geometric multilayer body within at least one target frequency range, such that the engineered aggregate exhibits a negative effective mass to trap at least a portion of the mechanical energy within the engineered aggregate such that the stress experienced by the surrounding matrix material is reduced.

In other embodiments the plurality of engineered aggregates are spherical.

In still other embodiments the core material is selected from the group consisting of steel, tin, brass, nickel, iron, lead, gold, and tungsten carbide.

In yet other embodiments the core material has a density of at least 10000 kg/m$^3$.

In still yet other embodiments the compliant material is selected from the group consisting of silicon, rubber, polyethylene, polypropylene, polystyrene and nylon.

In still yet other embodiments the compliant material has an elastic modulus of at least 1 GPa.

In still yet other embodiments the matrix material is selected from the group consisting of a mortar, polymer, epoxy and ceramic.

In still yet other embodiments the core material is lead, the matrix material is mortar, and the compliant material is nylon.

In still yet other embodiments the engineered aggregate includes at least one outer protective layer disposed atop the compliant coating.

In still yet other embodiments the target frequency at which each of the geometric multilayer bodies exhibit negative effective mass is dependent on the elastic modulus of the compliant material and the size of the geometric multilayer body in accordance with the following expression:

$$\omega^2 = 3/2 \cdot E_s/(R_I t \rho_I)$$

where $E_s$ is the elastic modulus of the compliant material, $R_I$ is the radius of the inner core, t is the thickness of the compliant layer, $\rho_I$ is the density of the core material and $\omega$ is the target frequency.

In still yet other embodiments at least two different types of engineered aggregates are disposed within the matrix, each type of engineered aggregate being adapted to induce a kinetic oscillation in the inner cores at a different target frequency range.

In still yet other embodiments the concentration of plurality of engineered aggregates disposed within the matrix is at saturation.

In still yet other embodiments the plurality of engineered aggregates are adapted to induce a kinetic oscillation at a target frequency characteristic of at least one energy wave type selected from the group consisting of seismic waves, blast waves, and aircraft vibration waves.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1A:
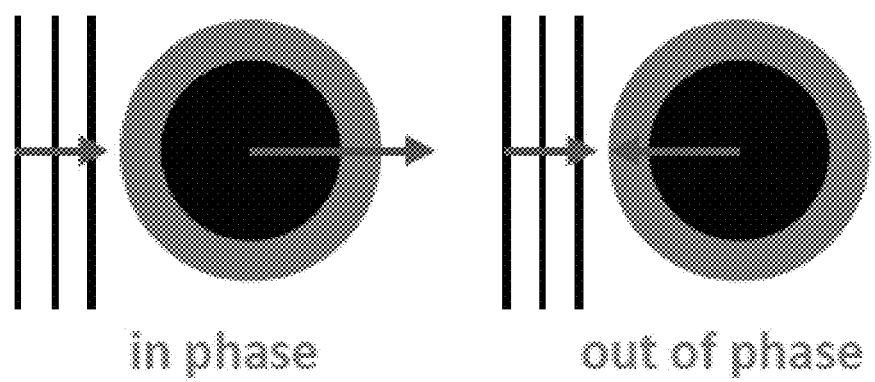
FIG. 1a provides a schematic of the resonance of an engineered aggregate in accordance with embodiments of the invention.

The present disclosure may be understood by reference to the following detailed description, taken in conjunction with the drawings as described below. It is noted that, for purposes of illustrative clarity, certain elements in various drawings may not be drawn to scale.

In accordance with the provided disclosure and drawings, materials and methods for implementing engineered aggregates in metamaterials are provided. In many embodiments, engineered aggregates and metamaterials encompassing composite materials that incorporate multi-layered aggregate inclusions in a matrix where the effective mass of the system depends on the natural resonance frequencies of the system, such that when the microstructure of the metamaterial is excited by an energy wave (such as elastic) near these natural resonance frequencies the metamaterial can exhibit a negative effective mass. In many other embodiments the dynamic performance of the metamaterial may be adapted to resist dynamic excitation by tuning the natural resonance frequency of the engineering aggregates contained therein. In some embodiments, such tuning may include adapting the composition and structure of the engineered aggregates disposed within the metamaterial to oscillate resonantly under the influence of an external energy wave (such as an elastic wave) of selected frequency or frequency range.

The engineered aggregates in accordance with embodiments generally comprise a multilayer resonant structure having at least a relatively heavy inner core surrounded by at least a compliant coating layer. In many embodiments the geometry and stiffness of the relative layers can be tuned to engineer a desired resonant frequency response within the aggregate for a chosen frequency or frequency range. In some embodiments the engineered aggregates are disposed in a matrix material to form a composite metamaterial. In exemplary embodiments the engineered aggregates may be disposed within a mortar matrix to form a concrete metamaterial suitable for use, for example, in structural applications, including bunkers, shelters, etc., and capable of resisting dynamic excitation of elastic waves from phenomenon such as seismic waves and explosive blast waves.

Composite structures are well known across a wide-variety of industries and applications. Many conventional composite materials generally comprise an inclusion disposed within a matrix material. Examples of such composite materials can be found in a variety of different fields, including polymers, ceramics, metals, etc. One extremely well-known structural composite is concrete, which mixes a stone, gravel or sand aggregate with a mortar matrix. However, in most of these conventional composites the composite acts as a homogeneous material in most respects. In the metamaterial in accordance with embodiments of the instant disclosure, these conventional inclusions are replaced by an aggregate that has been engineered to modify the dynamic response of the material system over a desired frequency range that is characteristic of particular dynamic actions or forces that would be experienced by the metamaterial in a particular application, such as seismic forces in building materials used in earthquake zones, blast loading in military applications, or certain vibrations in aircraft structures. In particular, in many embodiments the structural metamaterials include a matrix that binds within the composite a plurality of engineered aggregates formed from a multi-layer inclusion that has at least a hard inner core surrounded by a compliant layer. Because of this unique structure, the aggregates show resonant behavior, which under the action of particular frequencies causes the aggregates to oscillate about an equilibrium configuration, consequently trapping a portion of the supplied mechanical energy of the system. By tuning the materials, configuration, size and concentration of these engineered aggregates within the matrix, it is then possible to tune the resonant behavior of the metamaterial to adjust the range of frequencies to which the system can respond.

Tuning of Engineered Aggregates and Metamaterials

As has been briefly discussed above, by inclusion of engineered aggregates into a matrix according to embodiments, novel metamaterials may be formed having mechanical behaviors, and particularly dynamic mechanical responses, that differ from conventional composites. In particular, according to many embodiments when a metamaterial is exposed to an external elastic force having a natural frequency within a selected range, the engineered aggregates within the metamaterial are able to resonantly respond to trap or impede a portion of the mechanical energy supplied by the external force. This resonant response is caused by oscillatory motions characterized by an exchange of elastic and kinetic energy between the stiff core and the compliant surrounding layer. In other words, as shown schematically in FIG. 1a, the relative motion between the constituents of the metamaterial (the soft compliant layer and the relatively stiff inner core of the aggregate and surrounding matrix material) causes the heavy core to oscillate out of phase with the matrix creating an impedance mismatch that acts to absorb energy and mitigate the shock. The global effect is to reduce the stress in the surrounding matrix, enhancing the ability of the metamaterial to sustain the applied dynamical forces without damage.

To ensure an appropriate resonant response by the metamaterial, the engineered aggregates may be tuned so that the resonant oscillations of the internal mass of the aggregate is induced as the target dynamical force propagates through the material. In order to engineer the aggregates to perform as desired, it is useful to examine how the material properties of each phase in the aggregate influence the resonant behavior, thereby allowing one skilled in the art to select the set of materials and configure those materials to form a metamaterial suitable for a particular application.

Figure 1B:
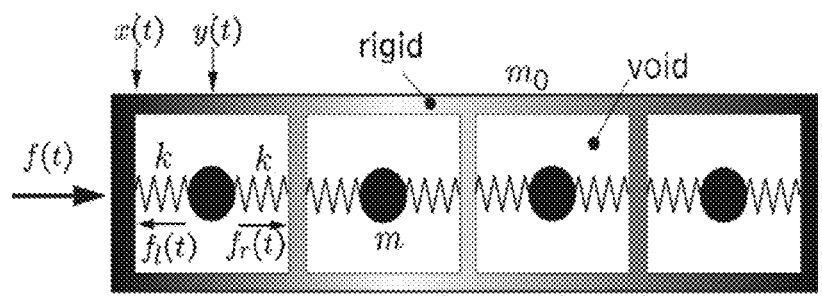
FIG. 1b provides a schematic of a one-dimensional model of a metamaterial system in accordance with embodiments of the invention.

The energy dampening behavior of metamaterials with engineered aggregates comprising resonant inclusions, as described in embodiments, is derived from the unusual material properties that these composites display, and in particular a phenomenon known as negative effective mass. Mass density is typically considered to be the volume average of the mass of the constituents. However, as discussed briefly above, in the case of metamaterials having engineered aggregates comprised of resonant inclusions, there is relative motion between the constituents and the matrix. This causes the dynamic effective mass density to be different from that found in the static case. A simple relation can be derived for the effective dynamic mass density by considering the subject metamaterials as being mechanically similar to a rigid bar with hidden voids containing a spring-mass system, as shown in FIG. 1b. The effective mass density for this system is a function of the oscillation frequency and is given by:

$$M(\omega) = m_0 \left[ 1 - \frac{\alpha \omega_r^2}{\omega^2 - \omega_r^2} \right],$$ (EQ. 1a)

where $$\omega_r := \sqrt{\frac{2k}{m}}$$

and $$\alpha := \frac{nm}{m_0},$$

where $m_0$ is the mass of the rigid bar, m is the internal mass, k is the spring constant, n is the number of voids, and $\omega$ is the forcing frequency.

Figure 1C:
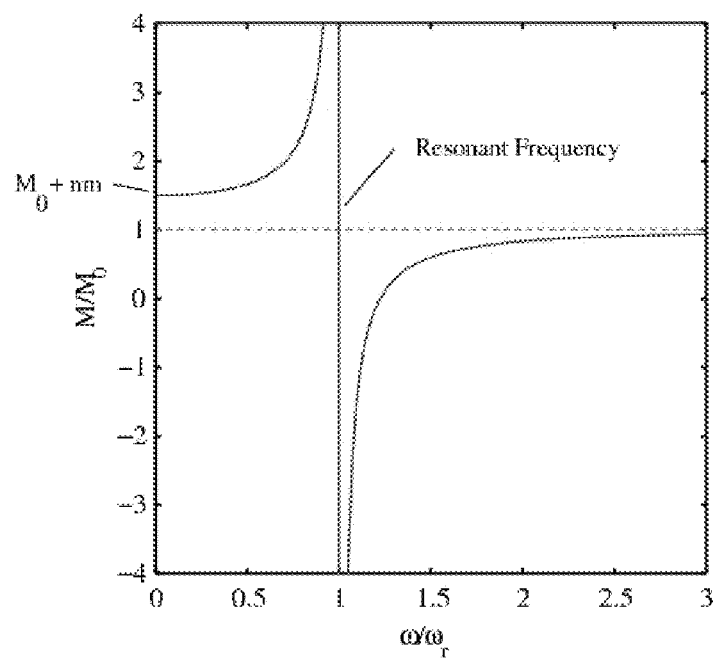
FIG. 1c provides a data graph of the variation of the effective mass with excitation frequency of the model of FIG. 1b.
Figure 1D:
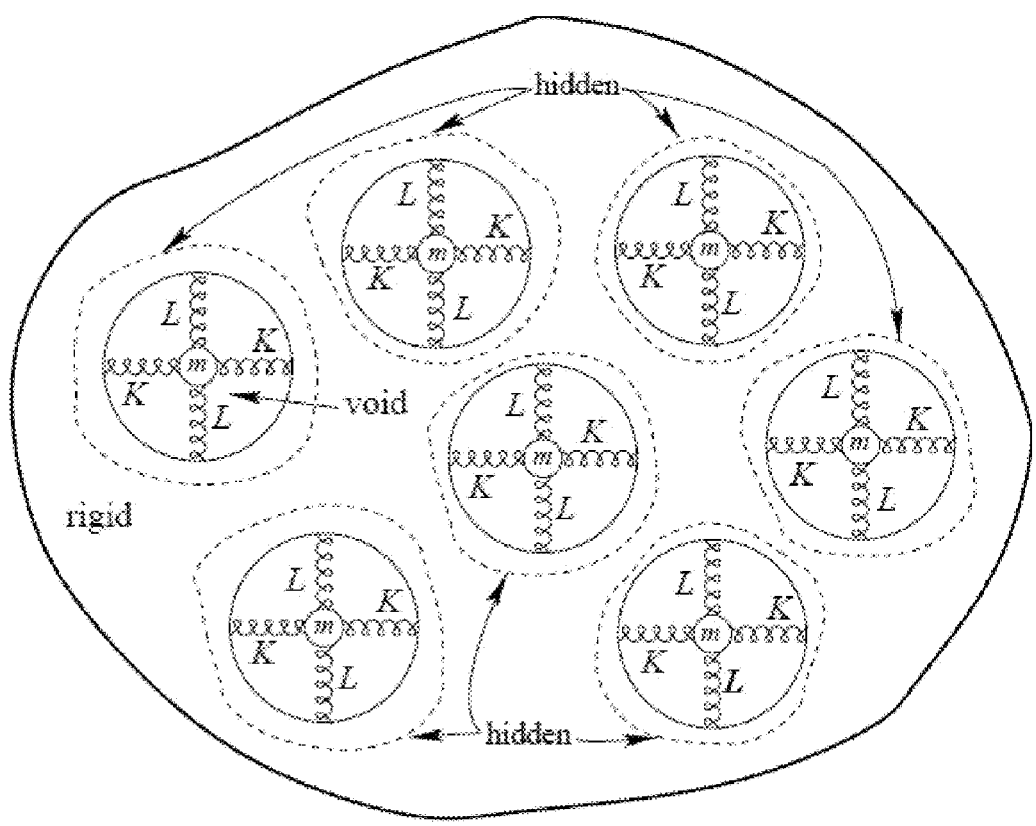
FIG. 1d provides a schematic of a two-dimensional model of a metamaterial system in accordance with embodiments of the invention.

Thus, when resonance of the heavy internal mass of the engineered aggregate is activated, the effective mass can become very large and negative in value, as demonstrated graphically in FIG. 1c. Note, a similar equation can be written for the two-dimensional case (as shown schematically in FIG. 1d) in accordance with:

$$M(\omega) = m_0 I + nm \begin{bmatrix} 2K/(2K - m\omega^2) & 0 \\ 0 & 2L/(2L - m\omega^2) \end{bmatrix},$$ (EQ. 1b)

Embodiments of metamaterials utilize this concept by employing multi-layer engineered aggregate inclusions that modify the dynamic response of the system over the frequency spectra typical of target dynamical forces, in particular for structural materials for dynamic forces that impart elastic or mechanical energy to the system. Using this mass-spring as being mechanically equivalent to the engineered aggregate it is then possible to derive a simple relationship that combines the main geometry parameters along with the stiffness of the soft coating. This relation can be used to define the range of resonant frequencies ideal for a particular application.

Figure 2A:
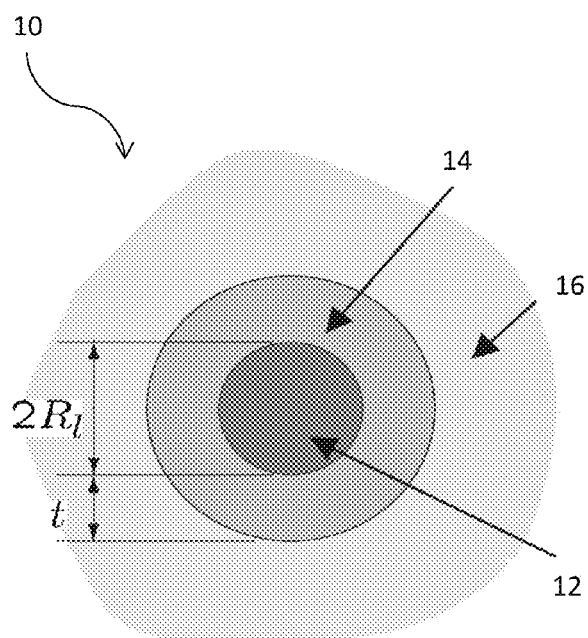
FIG. 2a provides a schematic diagram of an engineered aggregate in accordance with embodiments of the invention.

To provide an exemplary embodiment of such a determination, consider a single engineered aggregate (shown schematically in FIG. 2a as element 10). In this example the core of the aggregate (12) has a radius $R_I$ and a compliant surrounding layer (14) having a thickness t. The density of the core material is denoted by $\rho_I$, and the total mass of the core is given by:

$$m = \rho_l \left[ \frac{4}{3} \pi R_l^3 \right],$$ (EQ. 2)

The stiffness of the surrounding compliant material can be made equivalent to a spring constant k characteristic of the material given by:

$$k = \frac{E_s A}{t},$$ (EQ. 3)

where $A = \pi R_I^2$ is proportional to the core maximum section area, i.e., the portion of soft material resisting motion of the core. The resonant frequency of a one-dimensional system of mass m and with two equivalent springs of stiffness k is therefore given by:

$$\omega^2 = \frac{2k}{m},$$ (EQ. 4)

yielding $$\omega^2 = \frac{3}{2} \frac{E_s}{R_l t \rho_l},$$ (EQ. 5)

Using the above expression (EQ. 5) it is possible to find an optimal combination of geometry and mechanical properties of an engineered aggregate for any particular target frequency $\omega = \overline{\omega}$. For example, for an assigned engineered aggregate geometry it is possible to estimate the appropriate material stiffness $E_s$ as:

$$E_s = \frac{2}{3} R_l t \rho_l \overline{\omega}^2,$$ (EQ. 6)

Likewise, for an assigned material, the geometrical constraints of the engineered aggregate may be determined according to:

$$R_l t = \frac{3}{2} \frac{E_s}{\rho_l \overline{\omega}^2},$$ (EQ. 7)

This term can provide an approximate definition of the aggregate size for a desired frequency impedance.

Figure 1E:
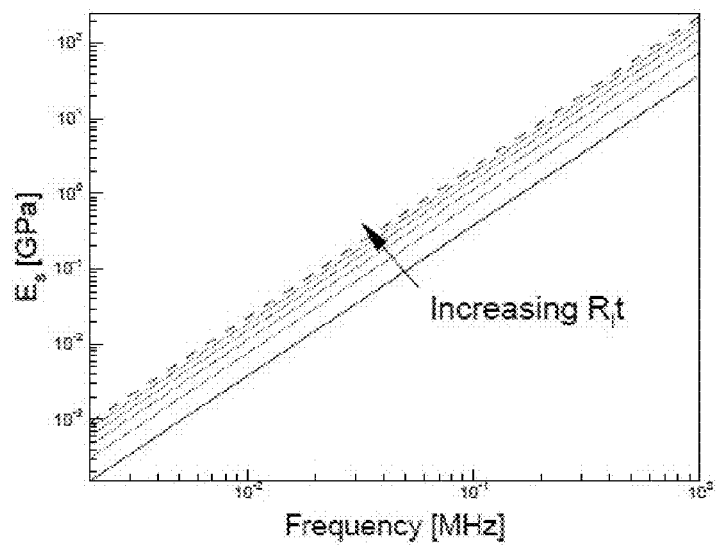
FIGS. 1e and 1f provide data graphs of: (1e) the elastic modulus of the outer compliant layer of an engineered aggregate (with lines corresponding to different aggregate sizes from 5 mm² (solid) to 30 mm² (broken)) as a function of the desired resonance frequency; and (1f) the size of the aggregate (with lines corresponding to different elastic moduli of the outer compliant layer of an engineered aggregate from 0.001 GPa (solid) to 100 GPa (broken)) as a function of the desired resonance frequency in accordance with embodiments of the invention.
Figure 1F:
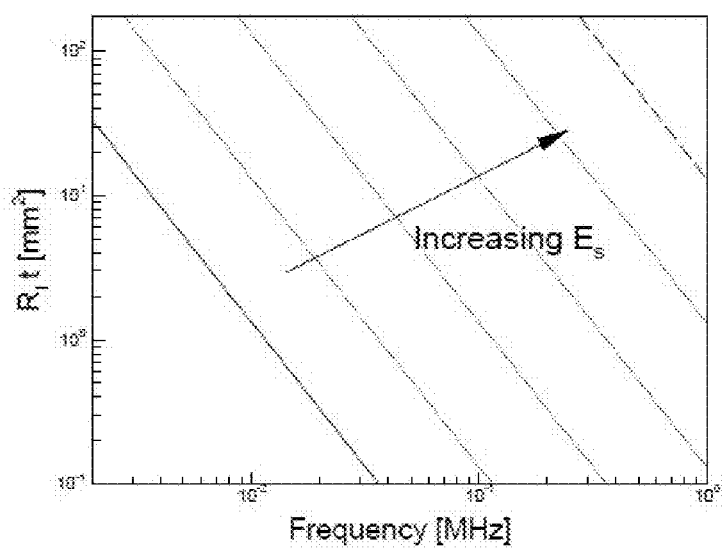

Using these derived models it is possible for one skilled in the art to tune the engineering aggregates to provide metamaterials capable of dynamically responding to any required resonant frequencies. For example, FIGS. 1e and 1f provide calculations of the variation of the ideal elastic modulus $E_s$ (FIG. 1e) and the size $R_I t$ (FIG. 1f) for model engineered aggregates for use in a concrete metamaterial with changing target resonant frequencies. The figures provide valuable design criteria depending on the proposed application of the metamaterial. For example, were the structural metamaterial to be used in an application where high frequency forces were expected, such as in a bunker for protection against blast pressure, then it would be advisable to adopt a relatively stiff coating material and a small aggregate size (as shown in FIG. 1e). However, were the metamaterial to be used in association with construction in a seismically active area, whose frequencies are on the order of 0.01 to 10 Hz, aggregates are preferably of a larger size and a lower value of elastic modulus should be chosen (as shown in FIG. 1f).

Although specific examples are described above, it should be understood that using the modeling behavior provided it is possible to determine ideal geometry and material properties for engineered aggregates capable of use in a wide-variety of possible applications dependent on the resonant behavior desired for a chosen frequency range.

Materials and Structures of Engineered Aggregates and Metamaterials

Figure 2B:
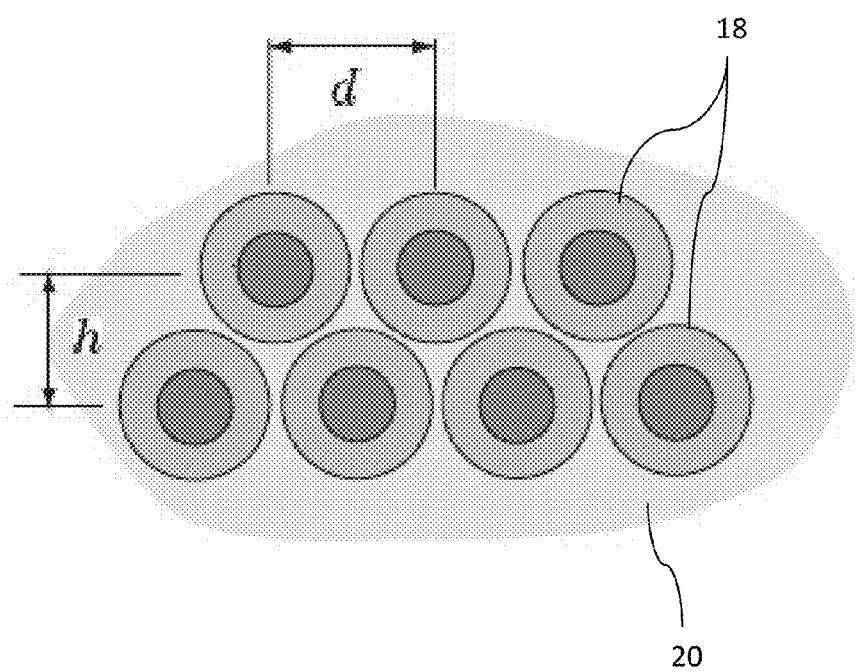
FIG. 2b provides a schematic diagram of an array of engineered aggregated in accordance with embodiments of the invention.

Turning now to the structure and materials of the engineered aggregates and metamaterials, as discussed above and shown schematically in FIG. 2a, in many embodiments the engineered aggregates comprise a multi-layer resonant inclusion (10) having at least a heavy inner core (12) surrounded by at least a compliant layer (14), the combination of multi-layers being adapted to modify the dynamic response of a composite material system, comprising in addition at least one matrix material (16), over the frequency spectra typical of a target dynamic action. As shown in FIG. 2b, in a metamaterial a plurality of these engineered aggregates (18) are disposed within a matrix (20) at a desired density.

As discussed in greater detail above, the materials used in forming the engineered aggregate, the number and type of layers, the geometry of the aggregate, the relative thicknesses of the layers, the concentration of the aggregate in the matrix, and material of the matrix can all be selected to tune the resonant properties of the metamaterial, as is apparent from the tuning methodologies set forth herein, such that the metamaterial demonstrates dynamic response properties, such as energetic wave attenuation, at a resonant frequency matched to the frequency or range of frequencies characteristic of the dynamic force or forces (e.g., in structural applications seismic waves or blast loading) that might be experienced by a structure incorporating the metamaterial.

Accordingly, although specific embodiments of metamaterials and their resonant properties will be discussed in greater detail below, it will be understood that a wide-variety of structural materials could be incorporated into embodiments of the metamaterials. For the purposes of embodiments of the engineered aggregates the heavy inner core may be comprised of any material or combination of materials having a suitable high mass density, such as, for example, steel, tin, brass, nickel, iron, lead, gold, tungsten carbide, etc. In some embodiments to core material has a density of at least 7000 kg/m$^3$, in other embodiments at least 10000 kg/m$^3$, and in still other embodiments at least 11000 kg/m$^3$. Likewise, for the purposes of embodiments of the engineered aggregates the compliant/elastic layer may be comprised of one or more layers of one or more materials having an elastic shear modulus that is generally more compliant than either the matrix or the inner core and is tuned such that the aggregate is adapted to behave as a resonator and demonstrate a negative effective mass when exposed to an energy wave within the desired frequency range, such as, for example, an elastic mechanical wave like a seismic wave, vibrational wave, or blast wave. Exemplary materials include, for example, silicone, rubber, polyethylene, polypropylene, polystyrene, nylon, etc. In some embodiments to compliant material has an elastic modulus of at least 10$^{-1}$ GPa, in other embodiments at least 1 GPa, and in still other embodiments at least 10$^1$ GPa It will be understood that to determine the parameters of an effective compliant material for a specific application it is possible to undertake an examination of the mechanical behavior of an exemplary metamaterial while varying the material properties (e.g., elastic modulus and density) and thickness of the compliant layer. An exemplary study is described below and summarized in FIGS. 3a to 3d and 4a and 4b for a blast shield application. In this example a parametric study is provided examining the relative contribution of the material properties and thickness of a compliant layer to the resonant properties of a metamaterial. The results of the analyses are presented in terms of the distribution of kinetic, elastic, and mechanical energies between the three phases of the metamaterial, and in terms of the maximum and minimum longitudinal stress observed in the matrix material.

FIGS. 3a to 3d provide plots showing the fraction of the total mechanical energy captured by exemplary engineered aggregates (in this case formed with lead cores and a mortar matrix material) as a function of the elastic modulus of the compliant coating. Each line of the plots refers to a different compliant coating thickness. The plots show that, in the case of a material for use in a blast shield application, in order to optimally transfer energy from the mortar to the lead cores, it is advantageous to have a compliant layer softer than the other two phases but still stiff enough to transfer stress. Compliant coatings that are very soft when compared to the matrix and core materials (such as, for example, silicone, natural rubber, or polyethylene) cause the exclusion of the hard phase from the dynamic behavior of the metamaterial, thus reducing the global stiffness of the system. Under such conditions, at an equal blast force, the metamaterial deforms more and the supplied energy is higher. In these cases, the performance of the metamaterial can be considered no better than that of standard mortar, as shown in the first three points in FIG. 3b. However, when the stiffness of the compliant material is comparable to the stiffness of both the lead and mortar phases, the metamaterial exhibits attenuation of the longitudinal stress with the propagation of the shock wave, due to trapping of the energy in the resonant cores. This effect is described in greater detail in Example 1, discussed below, and is observed in all the configurations characterized by a high modulus compliant coating, such as nylon or urea formaldehyde.

Figure 4A:
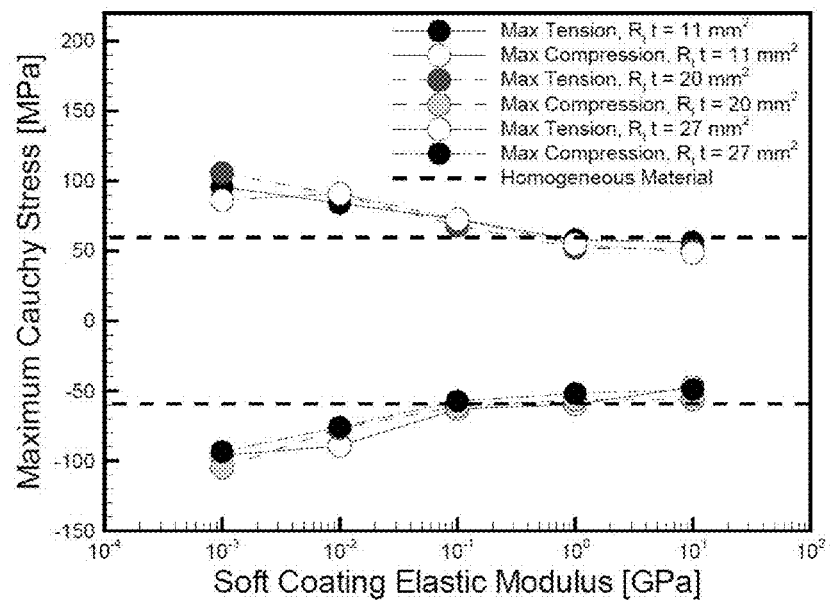
FIGS. 4a and 4b provide data graphs for the maximum and minimum longitudinal Cauchy stresses computed in the metaconcrete slab, as a function of the soft coating elastic modulus, where (4a) shows stresses in the full length of the slab; and (4b) shows stresses in the half slab distal from the blast face in accordance with embodiments of the invention.
Figure 4B:
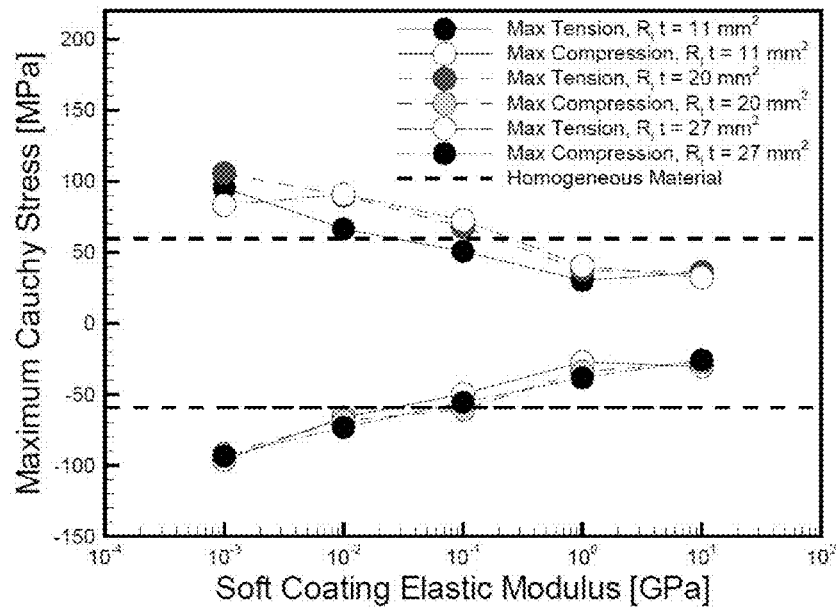

A similar result is obtained when observing the maximum tensile and compressive normal stressed observed in the matrix during the application of a blast-type dynamic stress, as shown in FIGS. 4a and 4b. The maximum longitudinal stress in the mortar is reduced with increasing compliant coating stiffness. In the case of urea formaldehyde, the maximum longitudinal stress is half of the stress computed for the silicone coating. The stress reduction is more evident when only the portion of the slab furthest from the blast site is considered (as shown in FIG. 4b). In this region, the maximum stress evaluated for the urea formaldehyde coating reduces to one fourth of the stress computed for the silicone coating. Therefore, the engineered aggregates described herein are shown to be able to reduce the amount of energy transmitted through the depth of the slab perpendicular to the blast face and, consequently, the magnitude of the stress in the mortar phase when appropriate combinations of matrix, core and compliant materials are selected.

Accordingly, in many embodiments the compliant layer is selected to be more compliant than the inner core and matrix materials, while still having a stiffness that is high enough to allow for the transfer of stress between inner core, compliant coating and matrix materials. In embodiments constrained to these combined materials conditions and exposed to blast-type dynamic forces, the compliant layer shows improved ability to transfer the mechanical energy being transmitted through the matrix into the dense inner core of the aggregate thus leading to the activation of the energy dampening elastic oscillations inside the resonant aggregates, leading in turn to the attenuation of the tensile and compressive stresses in the matrix material, which is typically most susceptible to weakening and fracture under high stresses.

As discussed above, one skilled in the art will recognize that based on these teachings suitable materials for the inner core, matrix and compliant coating may be chosen based on the desired frequency of resonance and aggregate geometry, and the stiffness of the matrix and inner core materials. For example, based on the calculations provided above, it is possible to obtain a list of exemplary coating materials covering the range of from 1 MPa to 10 GPa, see Table 1, below.

TABLE 1

Material Constants For Exemplary Coating Materials

| Material | Density (ρ) [kg/m³] | Elastic Modulus (E$_s$) [GPa] | (v) |
|---|---|---|---|
| Silicone | 1,100 | 0.001 | 0.47 |
| Natural Rubber | 900 | 0.01 | 0.49 |
| LD Polyethylene | 1,100 | 0.1 | 0.45 |
| Nylon | 1,150 | 1.0 | 0.40 |
| Urea formaldehyde | 1,500 | 10 | 0.40 |

Although the engineered aggregates shown in FIGS. 2a and 2b are bi-layered spheres comprising a relatively heavy inner core and a compliant outer core, it will be understood that other layers or aggregate geometries may be contemplated. For example, the inner core could be comprised of one or more relatively heavy materials such that this combined core of the engineered aggregate has a relatively high mass density when compared to the compliant layer. Likewise, the compliant layer may include one or more compliant materials or layers that collectively have an elastic shear modulus that is, in many embodiments, more compliant than the inner core material and the surrounding matrix and being capable of providing the desired resonant properties.

Although not shown in FIG. 2a or 2b, it should also be understood that additional layers may be incorporated into embodiments of the engineered aggregates. For example, in many embodiments the engineered aggregates may include one or more outer protective layers suitable to prevent damage, such as physical shock damage, water damage, etc. to the soft compliant layer of the aggregate. Such an outer protective layer(s) may include, for example, a hard steel layer to prevent physical damage to the compliant layer, or a thin polymer or plastic film or coating to provide waterproofing or chemical inactivation to the compliant layer, or the outer protective layer(s) may include one or more such layers to provide multiple types of protection to the compliant layer. It should be understood that any number and type of such outer protective layers may be included so long as the combined outer protective layers do not interfere with the desired resonant properties of the engineered aggregate.

Finally, although in many embodiments, as shown in FIGS. 2a and 2b, the engineered aggregate is generally spherical, it will be understood that suitable resonant geometric shapes will be apparent, including generally ellipsoids and many dimensional polyhedrons.

In other embodiments, mixtures of engineered aggregates could be included in a matrix to provide resonant frequency matching at more than one frequency or range of frequencies. In such embodiments, each separate set of engineered aggregates could be tuned as described above and placed in the matrix in sufficient concentration to ensure a global resonant response from the metamaterial across the desired frequencies. Utilizing resonant aggregates of different sizes provides additional functionality, enabling a larger range of natural frequencies to be impeded by the metamaterials.

As with the materials comprising the engineered aggregate, the materials used to form the matrix can vary depending on the particular metamaterial desired so long as the matrix material is adapted to bind the aggregate particles and maintain mechanical integrity for the specific application. For example, an exemplary set of matrix materials might include mortar for the formation of a metamaterial concrete, an epoxy to form a metamaterial epoxy composite, or suitable polymers or ceramics. As shown in FIG. 2b, the density of the engineered aggregates depends on the size of the aggregate and the relative distances between the aggregates d and h. Accordingly, the desired density of engineered aggregate introduced into the matrix can also be varied depending on the application. For example, in some embodiments, the matrix is saturated with the engineered aggregate such that the matrix serves as a binder for the engineered aggregates. In other embodiments, such as, a metamaterial concrete, standard mixture tables for aggregate, mortar matrix and water may be used to ensure suitable strength and formability of the material.

While only specific embodiments of the engineered aggregates and metamaterials are discussed above and in the examples below, it should be understood that many other materials and combinations might be provided that allow for the formation of structural metamaterials that exhibit resonant behavior when excited by dynamical loading. Likewise, it should be understood that many engineered aggregates may be designed in accordance with the methods and teachings of the disclosed embodiments that may be adapted to demonstrate oscillatory behavior when the natural frequencies of the internal masses are activated, and as a result have the capability to adsorb a consistent fraction of the mechanical energy, reducing the total energy and stress on the surrounding matrix material. In addition, it will be expected that many combinations of materials and geometries of multi-layered engineered aggregate inclusions in accordance with embodiments may be conceived that will be capable of tuning such that the aggregates are able to filter mechanical waves within a specific range of natural frequencies of interest.

EXEMPLARY EMBODIMENTS

The present invention will now be illustrated by way of the following examples, which are exemplary in nature and are not to be considered to limit the scope of the invention.
Methods and Material The following exemplary embodiments will describe the properties of a concrete for use in structural applications formed from an exemplary metamaterial. In this new concrete metamaterial the standard concrete aggregates of stone, gravel, and sand are replaced by bi-material spherical engineered aggregate inclusions. In these examples each engineered aggregate inclusion consists of a heavy lead core coated with a compliant outer layer (e.g. nylon), and in some cases encapsulated within a thin steel protective casing. The following studies will demonstrate that when this concrete metamaterial is subject to dynamic loading it causes the engineered aggregate inclusions to behave as harmonic oscillators. Moreover, the results will demonstrate that the engineered aggregate inclusions are characterized by natural frequencies that are determined by the size of the lead core and the deformability of the nylon outer layer, and can be tuned so that certain frequencies of the propagating elastic wave activate resonant oscillations. It will also be shown that the interaction of the applied wave motion with the resonating engineered aggregate inclusions causes favorable attenuation of the dynamic loading within the concrete metamaterial thus providing protection of the matrix material.

Finally, some studies explored the possibility of using a concrete metamaterial as a protective structure by modeling a slab subject to a blast loading. In this application, a periodic arrangement of uniformly sized metaconcrete aggregates are examined within a mortar matrix. The studies shown that it is possible to tune the volumetric proportion of the aggregate components and their corresponding mechanical properties in order to modify the range of natural frequencies so that they fall within the blast spectrum. It is also shown that the stress level across the slab thickness reduces with distance from the blast site, and that metaconcrete attains a significant reduction in the stress within the mortar matrix, attaining a small fraction of the stress observed in a homogeneous concrete slab.

Example 1

Finite Element Models

To further characterize the behavior of the concrete metamaterial under the action of blast loading, a model of simple geometry may be employed that will enable the dynamical effects to be easily understood. In the following cases an infinite planar slab of thickness L is considered, and attention is restricted to a square cross section (22) of material spanning the entire slab thickness (24), see FIG. 5. The concrete portion is constrained not to deform in the slab plane. The size b of the sample is chosen to be significantly smaller than the slab thickness and close to the actual size of the aggregates, which are arranged in a regular way at a distance d one from another (as shown in FIG. 2b).

These geometrical constraints impose the restriction:

$$2(R_I+t) \leq d. \tag{EQ. 8}$$

To increase the density of the aggregates, quarters of aggregate are modeled along the longitudinal edges, at a distance $h=d\sqrt{3/2}$ from the center of the aligned aggregates, (see FIG. 2b). The total volume and the total weight of the system can be expressed in terms of the components of volume and weight, or $$V_{tot}=V_m+V_s+V_l, \quad W_{tot}=V_m\rho_m+V_s\rho_s+V_l\rho_l, \tag{EQ. 9}$$

where $V_i$ and $\rho_i$ denote, respectively, the volume and the density of the component i. Indices m, s and l refer to the mortar, soft coating and lead phases, respectively. The volume fractions of the components $v_i$ and the filling fraction of the aggregates in terms of weight f is defined as:

$$v_i = \frac{V_i}{V_{tot}}, \tag{EQ. 10}$$

$$f_a = \frac{1}{W_{tot}}(V_s\rho_s + V_l\rho_l)$$

In the present study, it is assumed that: L=0.24 m, b=0.03 m, $R_I$+t=12 mm, and $R_I$ and t are varied according to the values reported in Table 2, below. The Table lists the number of nodes and elements of the discretized solid, the volume ratios, and the filling ratios. The filling ratio varies according to the choice of the soft coating material.

TABLE 2

Geometrical and Discretization Data

| | $R_I$ [mm] | t [mm] | $R_I$t [mm²] | $V_m$ [%] | $V_s$ [%] | $V_l$ [%] | $f_a$ [%] |
|---|---|---|---|---|---|---|---|
| A | 11 | 1 | 11 | 49.7 | 11.6 | 38.7 | 77.5-77.7 |
| B | 10 | 2 | 2 | 49.7 | 21.2 | 29.1 | 79.0-79.4 |
| C | 9 | 3 | 27 | 49.7 | 29.1 | 21.2 | 67.0-68.4 |

Figure 6A:
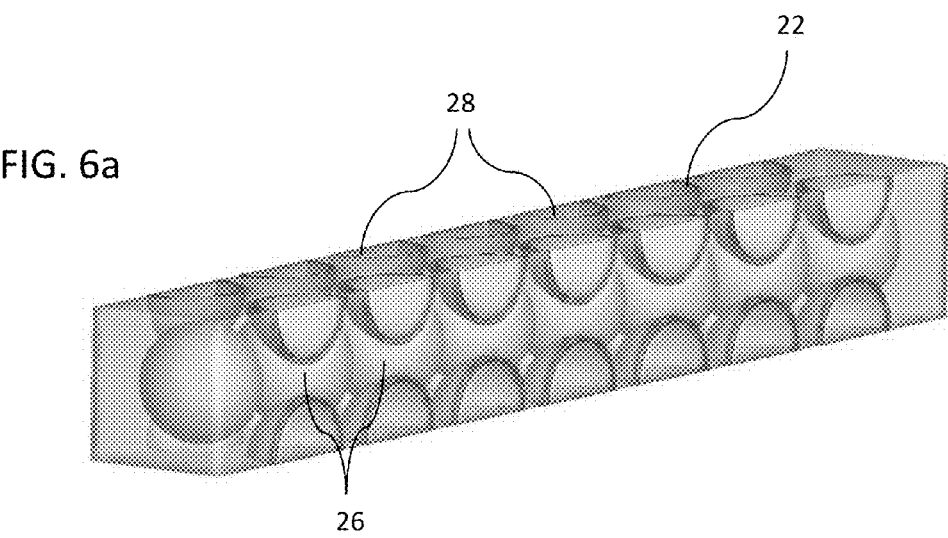
FIGS. 6a and 6b provide schematics of solid models and finite element discretization (mesh size h=2.5 mm) of a portion of the slab of FIG. 5.

Configuration A is visualized in FIG. 6a. The solid model has been discretized with a uniform mesh size of 2.5 mm, which reduces, if necessary, to a smaller value within the soft layer according to the coating thickness, see FIG. 6b. For all components, the material behavior is described by a neo-Hookean material model, extended to the compressible range and adopting the material properties listed in Table 1.

The system is excited by a blast pressure history, which activates a large spectrum of frequencies. It is assumed that the blast is applied to the forward side of the slab, while the opposite side is free to move, and a periodic boundary condition is applied to the lateral surfaces. A blast pressure history due to the ignition of a 10 kg TNT charge, located 0.015 m from the central point of the exposed surface is also assumed. The model of the blast pressure used in the calculations; an accurate description of the blast in air can be found, e.g., in G. Kinney, Explosive Shocks in Air, The MacMillan Company, New York, 1962, the disclosure of which is incorporated herein by reference. The blast force is characterized by the time history and frequency spectrum. The total blast force at time t is given by the resultant of the blast pressures acting normally to the exposed surface $A_{exposed}$, i.e.

$$F(t)=\int_{A_{exposed}} p(t)dA \tag{EQ. 11}$$

Figure 7A:
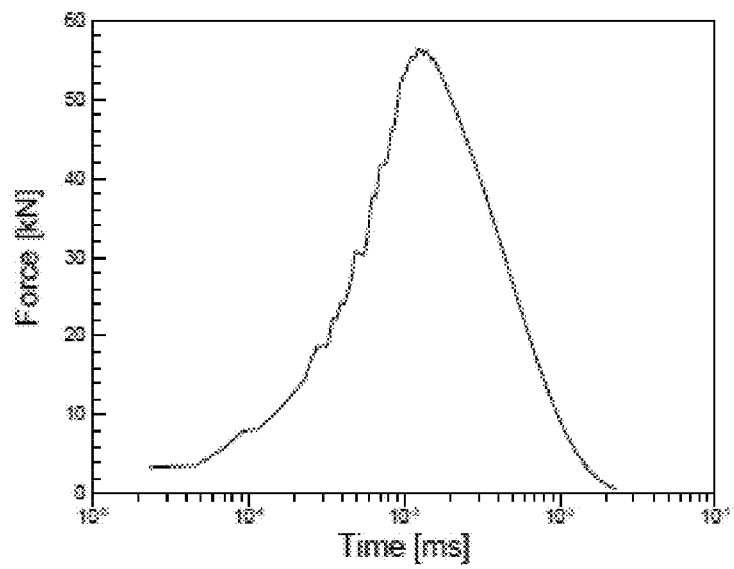
FIGS. 7a and 7b provide data plots, where (7a) shows variation in time of the resultant blast pressure on the exposed surface of the slab; and (7b) shows fourier transform (signal magnitude) of the blast force in accordance with embodiments of the invention.
Figure 7B:
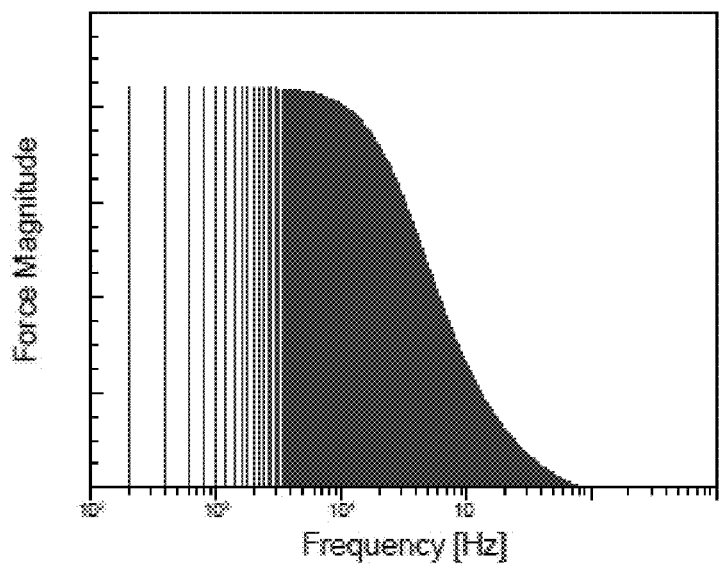

FIG. 7a shows the time history of the blast force graphically. The frequency spectrum is obtained in terms of magnitude through the Fourier transform (see FIG. 7b). For the present simulations, the blast pressure acts for a short time interval of less than 0.01 ms, and most of the excited frequencies are in the range between 1 kHz and 1 MHz.

Figure 8A:
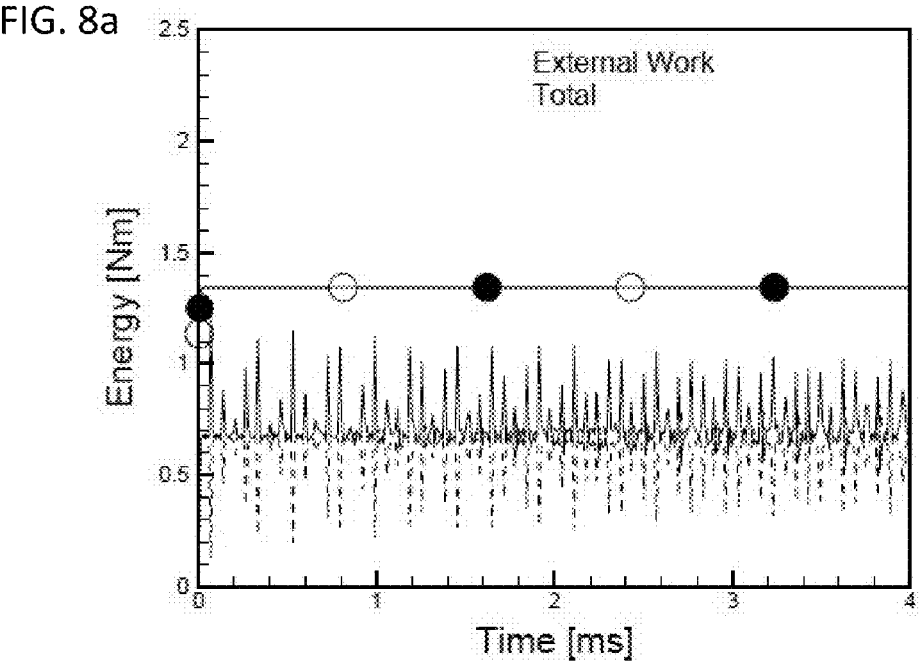
FIGS. 8a and 8b provide data plots for the global system energy history (supplied energy (white circles), elastic energy (broken line), kinetic energy (solid line) and total mechanical energy of the system (black circles), where (8a) is standard concrete; and (8b) is the concrete metamaterial in accordance with embodiments of the invention.
Figure 8B:
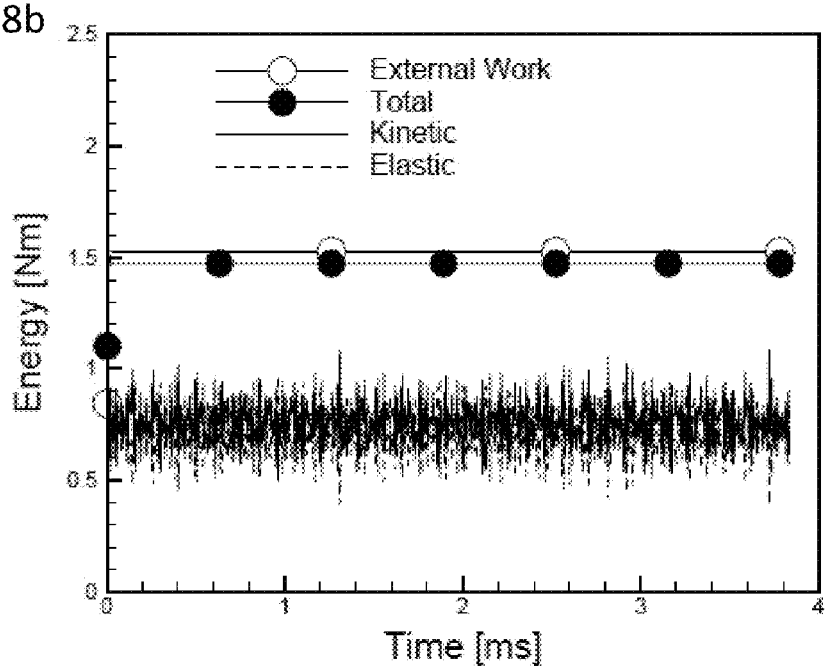

First, a qualitative illustration of the behavior of the concrete metamaterial when subject to a blast excitation is provided. As an illustrative example, a homogeneous concrete material is compared with the concrete metamaterial consisting of nylon coated inclusions of the configuration denoted A in Table 2. The two materials are compared using the energy history, which is shown in FIG. 8a for the case of the homogeneous concrete material, and FIG. 8b for the chosen concrete metamaterial. (In these figures, solid lines denote the total kinetic energy, broken lines the total elastic energy, black circles the total mechanical energy, and white circles the energy supplied to the system.) The supplied energy is given by the external work done by the pressure forces on the impacted surface:

$$W^{ext}=\int_0^t \int_{A_{exposed}} p(t)du(t)dA \tag{EQ. 12}$$

where du(t) is the incremental displacement component normal to the exposed area. Note that the amount of supplied energy differs depending on the configuration chosen for the concrete metamaterial and according to the choice of compliant coating material. Since the applied force is equal, the difference is due to the magnitude of the displacement at the exposed surface. FIG. 8 shows clearly that the system is conservative; the supplied energy provides the total mechanical energy and a continuous exchange between kinetic and elastic energy is observed during the process.

Figure 9A:
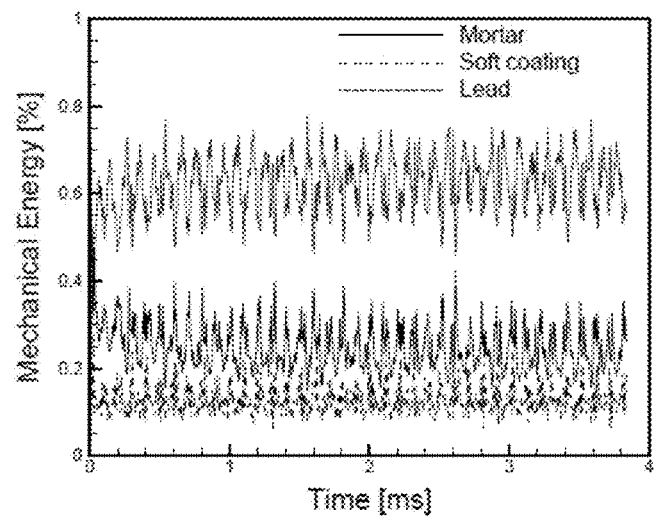
FIGS. 9a to 9c provide data plots showing the fractions of (9a) mechanical, (9b) elastic and (9c) kinetic energy carried by the three components of the concrete metamaterial in accordance with embodiments of the invention (percentages are expressed with respect to the total mechanical energy of the system).
Figure 9B:
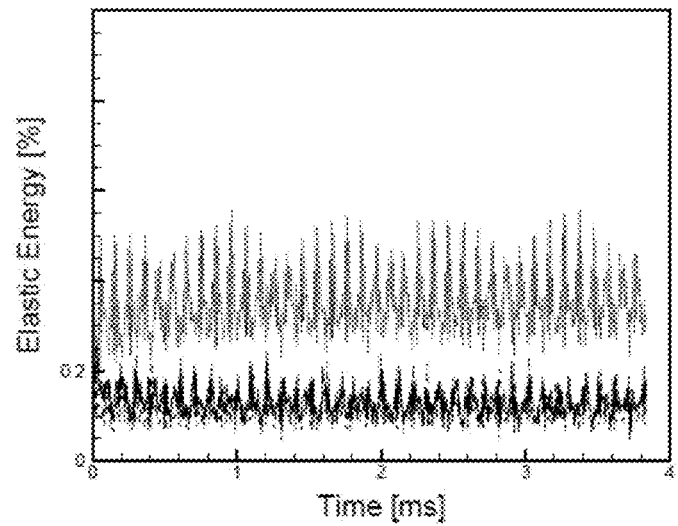
Figure 9C:
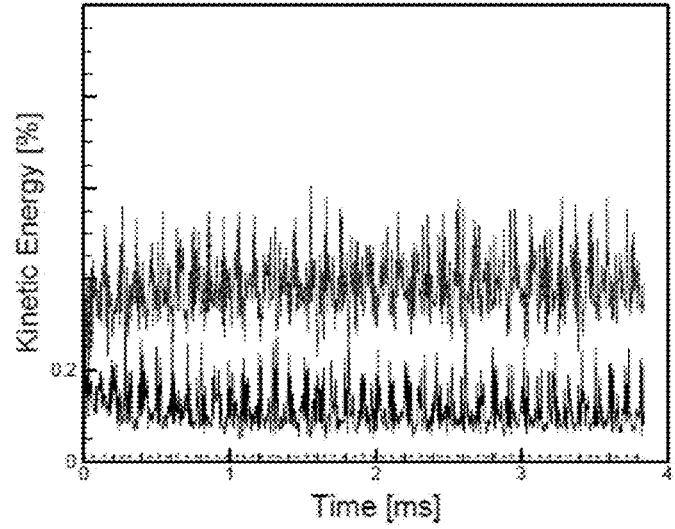

Details concerning the partition of the energy between the three components of the concrete metamaterial system can be observed in FIGS. 9a to 9c. The plots show the time histories of the mechanical, kinetic, and elastic energy, for each component of the system. Solid lines denote the energy carried by the mortar, broken lines the energy carried by the soft coating, and dotted lines the energy carried by the lead cores. The energies are expressed as a percentage with respect to the total mechanical energy of the system. For the configuration of the concrete metamaterial considered, FIG. 9a shows that approximately 60% of the mechanical energy is carried by the lead cores, while the mortar carries 30%. FIG. 9b shows that the elastic energy in the mortar and in the soft coating is only one third of the elastic energy in the lead cores, which undergo elastic oscillations. FIG. 9c shows that a large amount of kinetic energy remains trapped in the lead cores. Comparison of the plots confirms the presence of oscillatory motion of the lead cores inside the aggregates.

Figure 10A:
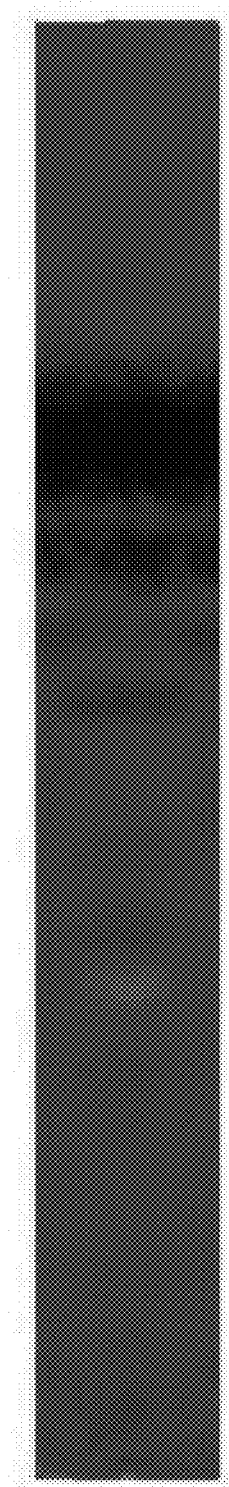
FIGS. 10a and 10b provides images comparing the distribution of the horizontal normal stress at the same time step between (10a) standard concrete; and (10b) a concrete metamaterial in accordance with embodiments of the invention.
Figure 10B:
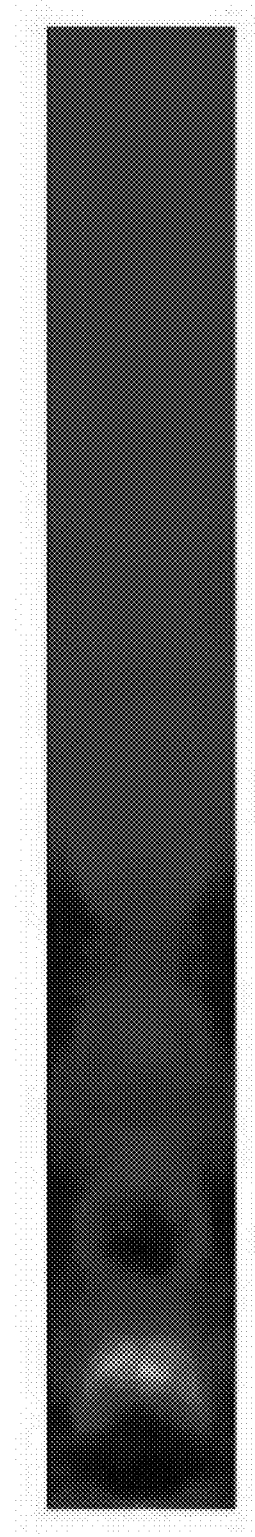

Further insight into this oscillatory behavior can be revealed by studying the longitudinal stress distribution along the surface of the mid-longitudinal cross-section of the slab. FIG. 10 compares the stress distribution a few tenths of a millisecond after the beginning of the blast in both the homogeneous concrete material and the concrete metamaterial, where the blast surface is located at the left end of the section. At this point in the time history the compressive shock wave is traveling for the first time towards the back side of the slab. In the figure, dark gray shades denote compression and lighter white shades denote tension. In standard concrete, which can be considered a homogeneous material, the first shock wave travels at the velocity of the longitudinal wave speed while preserving a regular one-dimensional structure. In the concrete metamaterial slab the front shock wave propagates at lower speed, and the average magnitude of the longitudinal stress reduces with the distance from the blasted surface. The aggregates in turn are subject to elastic oscillations, which can be observed in the left side of FIG. 10b. The resonant behavior can be seen in the second inclusion from the left; the lead core is under compression in the center and under tension in the annular region adjacent to the coating.

Elastic Wave Transmission Through Metamaterial

The beneficial transfer of energy and the implication of resonance induced negative effective mass suggest the need to investigate the behavior of a concrete metamaterial slab at fixed frequencies of applied loading. Transmission ratio plots have been used to quantify the band gap and resonance induced behavior of phononic crystals with an analogously layered structure. (See, Sheng et al, Physica B: Condensed Matter 338(1-4) (2003) 201-205, the disclosure of which is incorporated herein by reference.) These crystals have been shown to exhibit resonant behavior when experimentally tested with sound waves of varying frequencies, where the ratio of the change in wave amplitude across the crystal is measured and plotted against input wave frequency. A similar ratio can be computed for the concrete metamaterial by considering the amount of energy transmitted through a slab. Here, only the case where the constituents behave in a purely elastic manner are considered and a sinusoidal displacement is applied to one end face of the slab at a prescribed frequency. The amount of energy trapped within the aggregates is averaged over a fixed period of time and the transmission ratio is then calculated after two transits of the applied wave through the slab. The transmission coefficient, T, is computed using the ratio of the amount of energy trapped in the last aggregate relative to the total energy trapped within all the aggregates of the slab, according to:

$$T = \frac{E_{last\,aggregate}}{E_{all\,aggregates}} \quad (EQ.\ 13)$$

where E is the average of the total mechanical energy for the duration of the calculation.

Figure 11:
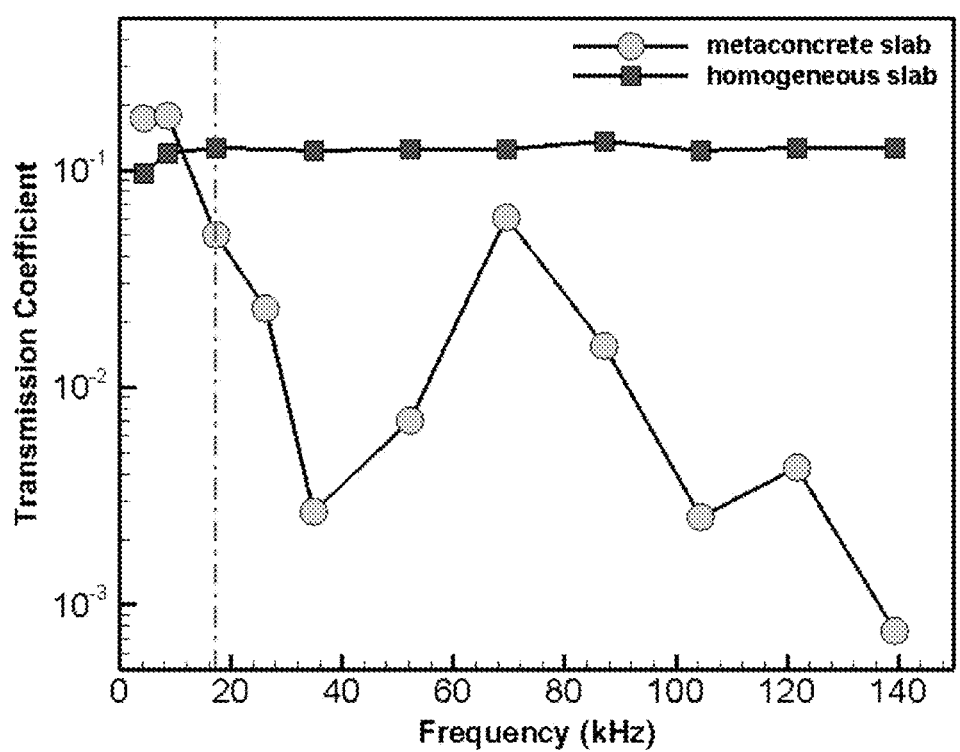
FIG. 11 provides a data graph of the transmission coefficient plotted against frequency of excitation for a concrete metamaterial slab consisting of 1 mm nylon coated inclusions, the corresponding transmission coefficients for a homogeneous slab, and the resonant frequency of the inclusion at 17.4 kHz (dashed line) in accordance with embodiments of the invention.

The results of the concrete metamaterial blast wave simulations suggest a potential aggregate configuration consisting of a 1 mm nylon coated lead core. The transmission plot resulting from an analysis using a slab of the form shown in FIG. 6b, consisting of an array of aggregates with the optimal configuration, is shown in FIG. 11. The plot shows a low frequency dip in the transmission coefficient near the resonant frequency of 17.4 kHz. The transmission plot also displays a second dip in the higher frequency range, possibly due to the interaction of the periodic array of concrete metamaterial aggregates. Furthermore, a reduction in transmission ratio is observed in comparison to that achieved with a homogeneous concrete slab, suggesting improved performance within the range of frequencies corresponding to the dips. This indicates the existence of band gaps within the frequency spectrum and also suggests a frequency range for which a particular aggregate configuration provides the most beneficial behavior. For the 1 mm nylon coated inclusion, this is given by the frequencies in the range of approximately 20-60 kHz. The understanding gained from this analysis can be further utilized for the design of concrete metamaterial aggregates for specific loading applications where attenuation of dynamic excitation is desired.

Brittle Fracture in Metamaterial

Figure 5:
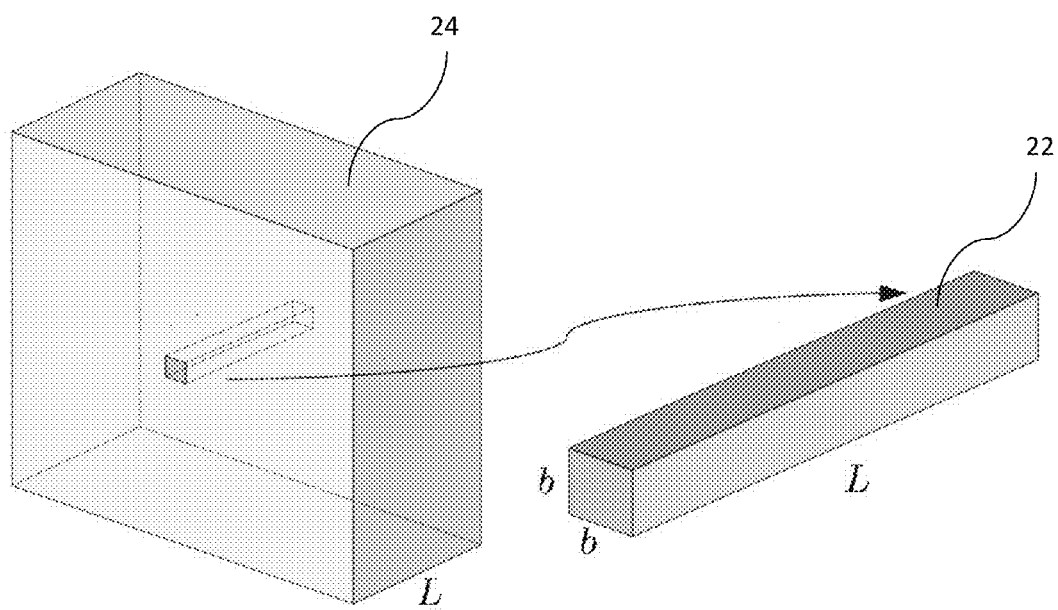
FIG. 5 provides a schematic of the finite element model experiment where thickness is L, and the edge length is b in accordance with embodiments of the invention.
Figure 6B:
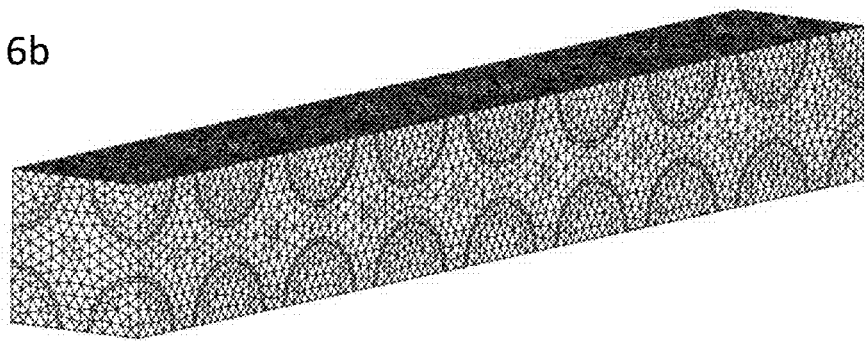

In a final finite element study, concrete metamaterial slabs consisting of purely elastic constituents, as shown in FIG. 5 were examined. A slab section (22) containing 8 whole spherical inclusions (26), and 28 quarter spheres (28) surrounding the outer edges as shown in FIG. 6b was used. As in the other studies the system was excited by a blast pressure history caused by the ignition of a 10 kg TNT charge, located 0.015 m from the central point of the end exposed surface of the slab.

Figure 3A:
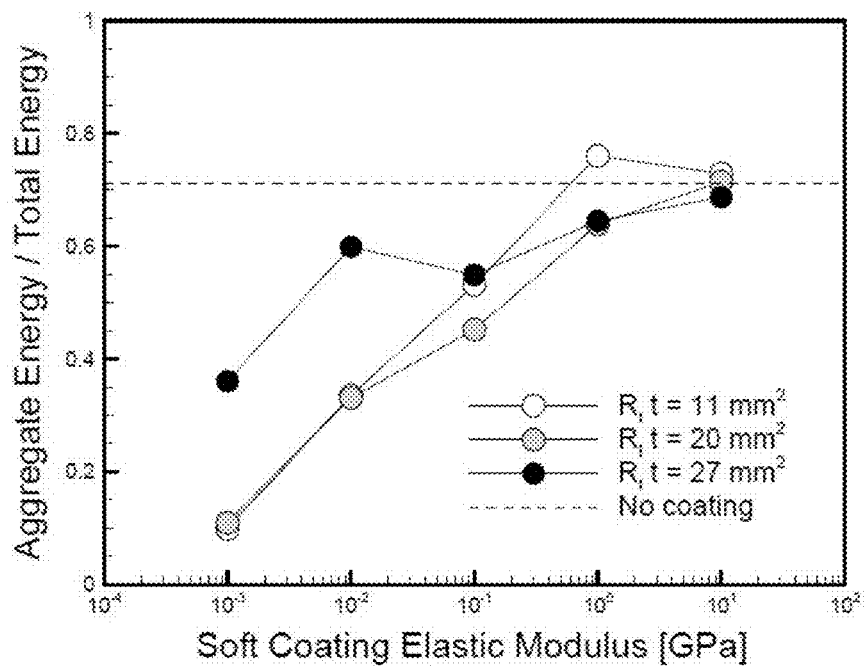
FIGS. 3a to 3d provide data graphs from parametric studies varying the soft coating thickness and elastic modulus of the aggregate, where (3a) shows the fraction of the total mechanical energy captured by the aggregates; (3b) shows the average mechanical energy density of the mortar with respect to a homogeneous concrete slab; (3c) shows the average elastic energy density of the mortar with respect to a homogeneous concrete slab; and (3d) shows the average kinetic energy density of the mortar with respect to a homogeneous concrete slab all in accordance with embodiments of the invention.
Figure 3B:
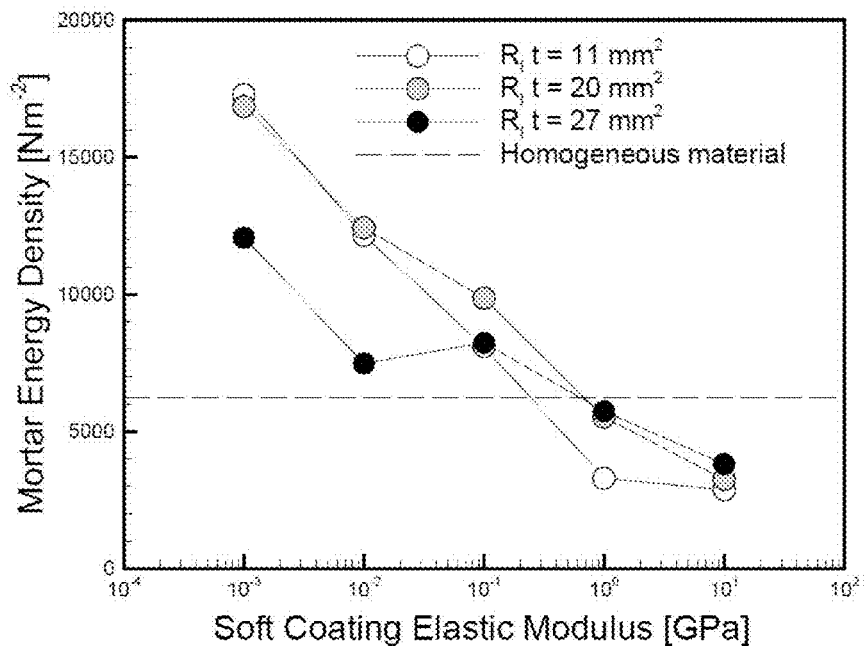
Figure 3C:
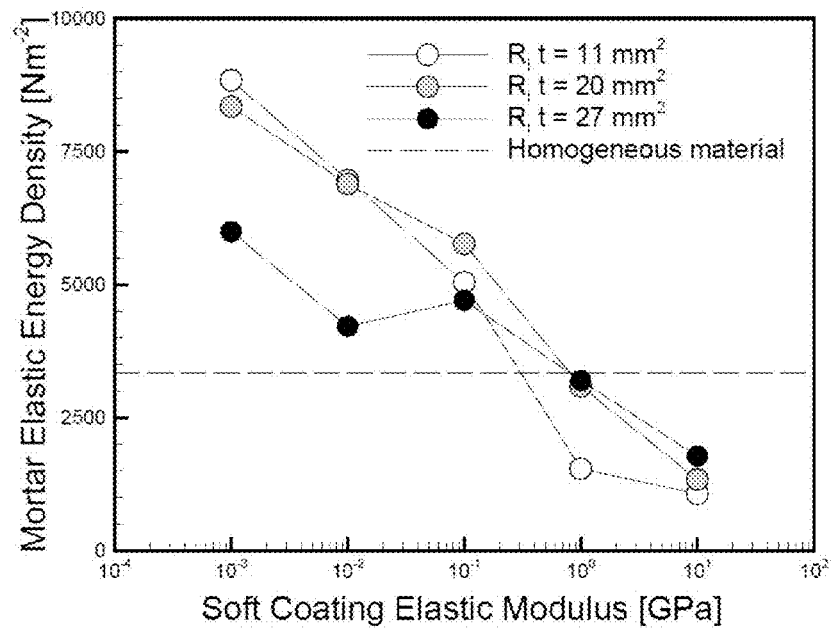
Figure 3D:
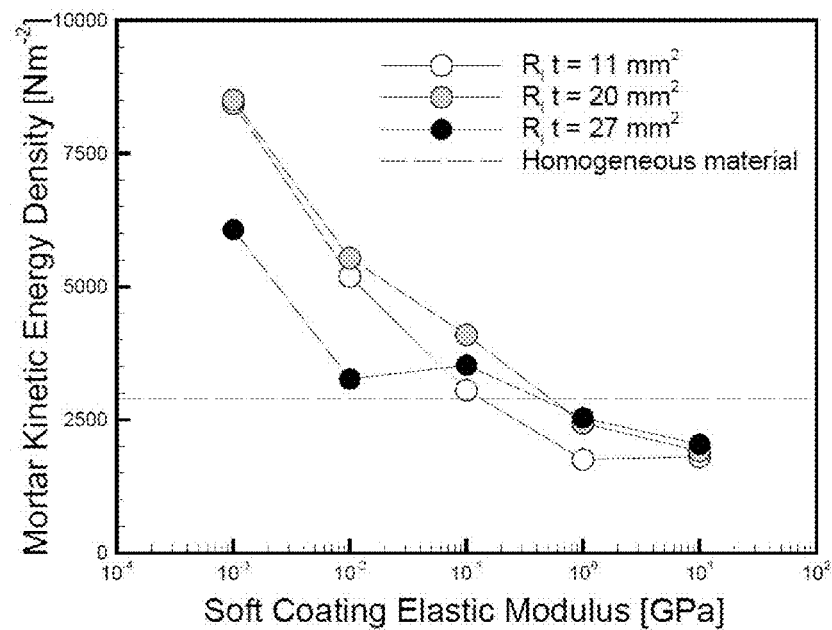

A number of different aggregate coatings and thicknesses were investigated under these conditions, and the amount of energy trapped within the aggregates is shown to vary with the coating geometry and properties. FIG. 3a shows the amount of energy trapped within the aggregates as a fraction of the total mechanical energy, plotted against the elastic modulus of the coating material. The aggregate energy for the two highest elastic moduli, corresponding to nylon and urea formaldehyde coatings, shows the largest fraction of energy trapped within the aggregates for all three geometry configurations, with approximately 60 to 70% of the total energy carried by the inclusions. Similarly this corresponds to a reduction in mortar energy density and mortar stress.

This investigation considered only purely elastic concrete metamaterial constituents. However, mortar is not a purely elastic material and as such the damage and fracture properties must also be included. Using the same finite element mesh and slab configuration, it is possible to extend the analysis by implementing an eigenerosion scheme to simulate the fracture and damage sustained by the mortar matrix within the slab. In this model, fracture is conveniently modeled with an eigenerosion algorithm (A. Pandolfi & M. Ortiz. International Journal for Numerical Methods in Engineering, 92:694-714, 2012, the disclosure of which is incorporated herein by reference), derived from the more general eigenfracture approach (B. Schmidt, et al., SIAM Multiscale Modeling and Simulation, 7:1237-1266, 2009, the disclosure of which is incorporated herein by reference).

Eigenfracture is an approximation scheme for variational models of Griffith's theory of fracture (L. Ambrosio and V. M. Tortorelli. Bollettino dell'Unione Matematica Italiana B, 7:105-123, 1992, the disclosure of which is incorporated herein by reference) that resorts to the classical device of eigendeformations in order to account for material fracture. To this end, the energy functional of the system is assumed to be dependent on two fields: the displacement field and an eigendeformation field, that describes cracks as may be present in the body. In the eigenfracture scheme the fracture energy is set to be proportional to the volume of the ε-neighborhood of the support of the eigendeformation field, suitably scaled by 1/ε.

The optimal crack set is obtained by minimizing the energy functional with respect to both the displacement and the eigendeformation fields, subject to irreversibility constraints. Eigenerosion is derived from the general eigenfracture scheme by restricting the eigendeformations to be either zero, in which case the local behavior is elastic, or equal to the local displacement gradient, in which case the corresponding material neighborhood is eroded. When combined with spatial discretization, this scheme gives rise to element erosion, i.e., each element can be either intact, in which case its behavior is elastic, or be eroded and has no load bearing capacity. The convergence properties of the eigenerosion scheme for model fracture propagation in three dimensional problems have been discussed in Pandolfi and Ortiz (2012), cited above.

To extend the elastic analyses and gain a greater understanding of the behavior of the concrete metamaterial the promising geometry and inclusion coating elastic moduli found previously, which corresponds to 1 mm nylon coated aggregate inclusions, was investigated. In this study the slab is subject to similar blast loading conditions as in the elastic case, however an extra parameter is now included in the analyses, the Griffith energy release rate, $G_c$, which is supplied for the execution of the eigenerosion scheme. This new parameter is an indication of the strength of the mortar material, a smaller value implying a mortar that is more susceptible to fracture.

Figure 12A:
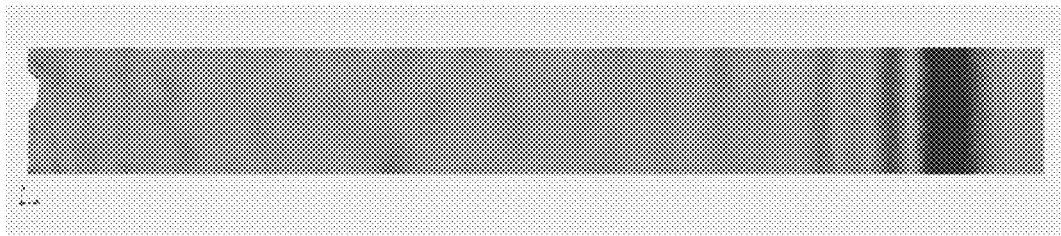
FIGS. 12a and 12b provide images of the first transit of the shock front progressing through (12a) a homogeneous concrete slab; and (12b) a concrete metamaterial slab, accounting for the effect of brittle fracture in accordance with embodiments of the invention.
Figure 12B:
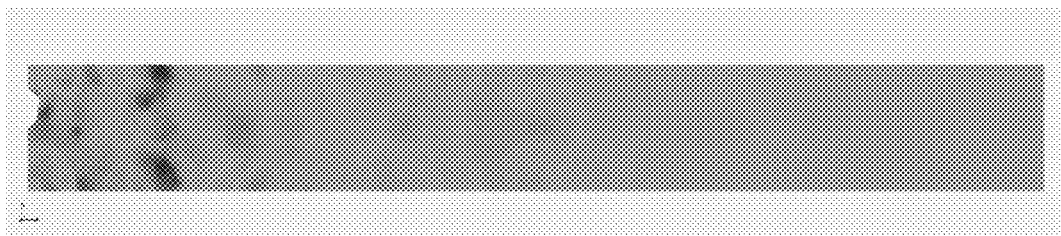

FIGS. 12a and 12b show the resulting wave propagation for a concrete metamaterial slab in comparison to a homogeneous slab of the same configuration, for an energy release rate $G_c$=70 J/m². Damage and erosion of the mortar material as a result of the explosion can be seen at the left end of the slab. The results show the same amount of damage at the explosion site; however there is a reduction in the stress intensity and shock wave velocity in the concrete metamaterial with comparison to the homogeneous slab. The shock front is observed to be delayed and trapped within the concrete metamaterial aggregates. The homogenous slab, by contrast, shows a planar shock front that progresses more quickly through the slab depth. A similar result was seen in the elastic analyses. This demonstrates the ability of concrete metamaterial to sustain mortar damage and reduce mortar stress, indicating the improved performance that may be gained by utilizing a concrete metamaterial slab for shock wave mitigation and blast shielding applications.

Example 2

Impact Behavior of Concrete Metamaterial

In order to verify the energy trapping observed in the numerical simulations, experimental testing needs to be performed to non-destructively test a concrete metamaterial specimen. The experiment would be designed to activate the resonance and the energy trapping properties of the engineered aggregates by generating a pulse loading through a collision between a striker bar and a concrete metamaterial specimen. The geometry and elastic modulus of the coating material determine the resonant frequency of the aggregate, and thus the theoretical required wave frequency for energy absorption.

Figure 13A:
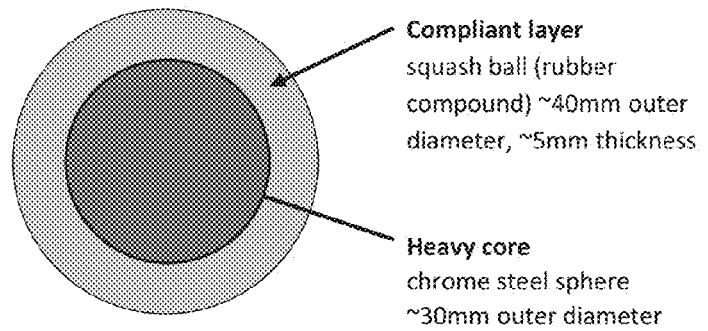
FIGS. 13a and 13b provide a (13a) schematic and (13b) image of an exemplary concrete metamaterial aggregate in accordance with embodiments of the invention.
Figure 13B:
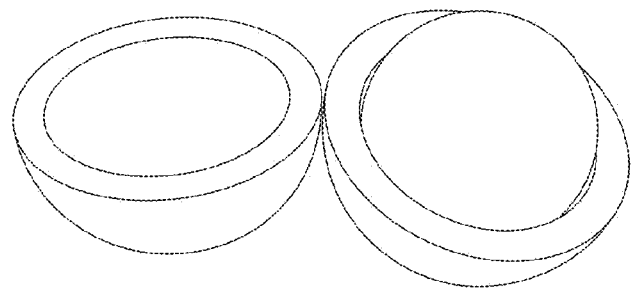

An experimental aggregate design is shown schematically and in a photograph in FIG. 13b. As shown, it consists of a chrome steel core encapsulated within a rubber coating, with an outer aggregate diameter of 40 mm. To manufacture the aggregate a rubber squash ball was cut open and a chrome steel sphere glued into the hollow center. The two halves of the aggregate were then joined together using flexible adhesive. The joint is sealed to prevent any mortar seepage through the aggregate. To tune the aggregates for the numerical simulations, the spring-mass model as given by EQ. 5. For the rubber coated chrome steel aggregates, these values are $E_s$=0.01 GPa, t=5 mm, $R_c$=15 mm, and $\rho_c$=6920 kg/m3. Therefore, using the tuning equation, the resonant frequency of the aggregate is ω=5376 rad/s, or f=856 Hz. This value is used as a basis for designing the other experimental parameters and dimensions.

Figure 14:
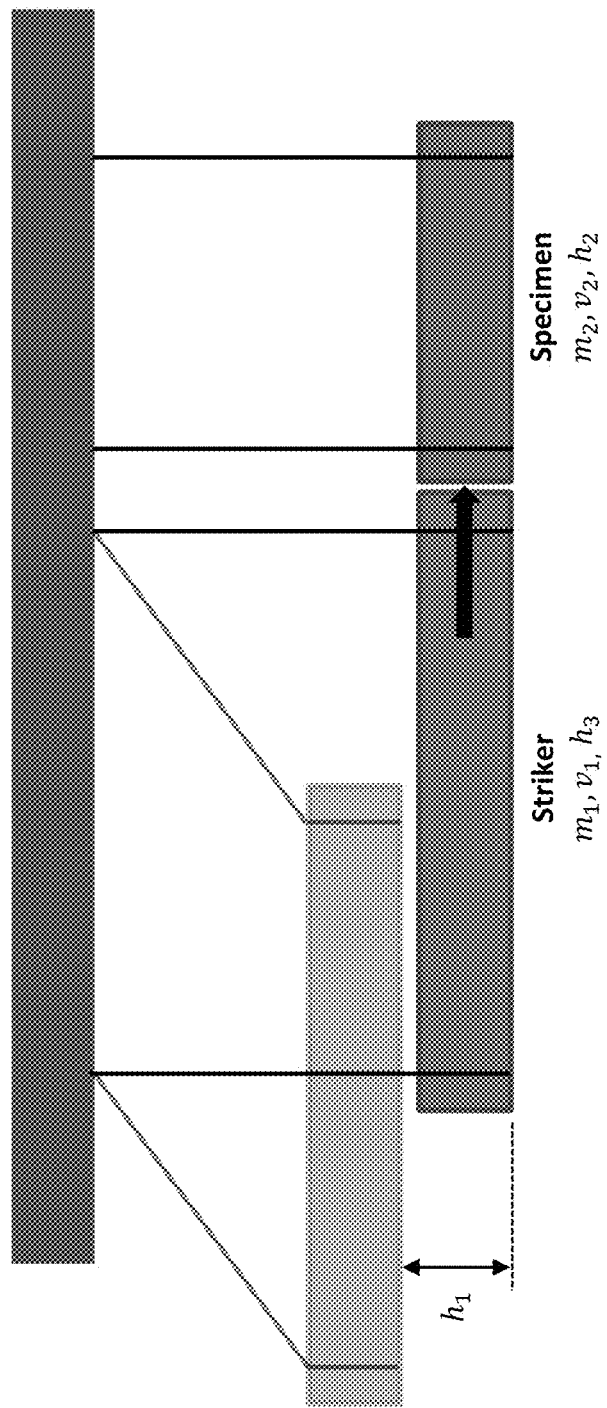
FIG. 14 provides a schematic of a pendulum-like test apparatus in accordance with embodiments of the invention.

The experimental setup consists of a striker bar impacting on a cylindrical concrete metamaterial specimen. The specimen is initially at rest and the system uses the pendulum-like arrangement shown in FIG. 14. The striker bar is raised to a height $h_1$ and then released from stationary so that it reaches the specimen with a velocity $v_1^-$, where the superscript indicates velocity before impact. The specimen then swings to a maximum height $h_2$ and the striker to a height $h_3$, both of which are measured using a video camera. Therefore, the known quantities are the mass of the striker and the specimen, $m_1$ and $m_2$, respectively, and the experimentally measured heights $h_1$, $h_2$, and $h_3$. From this information, it is possible to compute the amount of energy absorbed by the concrete metamaterial aggregates $E_a$, along with the efficiency of the concrete metamaterial sample, which is based on a comparison of this result with the total input energy. Using an energy balance, the energy absorbed by the concrete metamaterial aggregates is given by:

$$E_a = m_1 g(h_1 - h_3) - m_2 g h_2 \quad \text{(EQ. 14)}$$

The efficiency can be expressed as the fraction of the supplied energy that is trapped within the concrete metamaterial aggregates. The supplied energy is given by the total potential energy of the striker before release, thus the efficiency is $$\text{Efficiency} = \frac{E_a}{g h_1 m_1} \quad \text{(EQ. 15)}$$

It is therefore possible with such a set up to compare the efficiency of a concrete metamaterial specimen to that of a regular mortar specimen, which allows for the determination of the amount of energy trapped within the aggregates of the concrete metamaterial sample.

In order to activate resonance within the aggregates, it is necessary to design the striker so that the imparted wave is of a frequency as close as possible to the resonant frequency of the aggregates. This frequency can be approximated by using the first natural frequency of the striker bar, $$\omega = (\pi c_L)/L \quad \text{(EQ. 16)}$$

where $c_L$ is the longitudinal wave speed and L is the length of the striker bar. Therefore, the frequency in Hertz is given by $$f = c/2L \quad \text{(EQ. 17).}$$

It is also possible to make use of the ratios for the reflectance and transmittance, R and T, respectively, which provide a measure of the amount of energy reflected and transmitted through the impact interface. These are calculated using the mechanical impedance, Z, which is the product of the density, ρ, and the longitudinal wave speed, $c_L$. The ratios are given by the following expressions:

$$R = \left(\frac{z^A - z}{z^A + z}\right)^2 \quad \& \quad T = \frac{4z^A z}{(z^A + z)^2} \quad \text{(EQ. 18)}$$

where the superscript A denotes the second medium.

It is therefore possible to tune the striker bar so that the length produces a wave of frequency similar to that of the chosen concrete metamaterial aggregates. Checking a number of different striker materials, as shown in Table 3, it can be seen that while the Aluminum striker provides the highest transmittance of energy, the length required to generate the resonant frequency is too long for practical installation in the experiment. Therefore a PVC striker was chosen for the experiment, which provides 46% transmittance of energy and a reasonable length for activation of 0.6 m.

TABLE 3

Striker Materials

| Material | ρ kg/m³ | $c_L$ m/s (10⁹) | $P_c$ kg/m³ | R % | T % | L for 856 Hz M | f for L = 12 in kHz |
|---|---|---|---|---|---|---|---|
| Concrete | 2500 | 3400 | 8.5 | — | — | — | — |
| Al | 2700 | 6400 | 17.28 | 12 | 88 | 3.7 | 10.5 |
| Steel | 7900 | 6100 | 48.19 | 49 | 51 | 3.6 | 10 |
| PVC | 1218 | 1060 | 1.29 | 54 | 46 | 0.6 | 1.7 |

Figure 15:
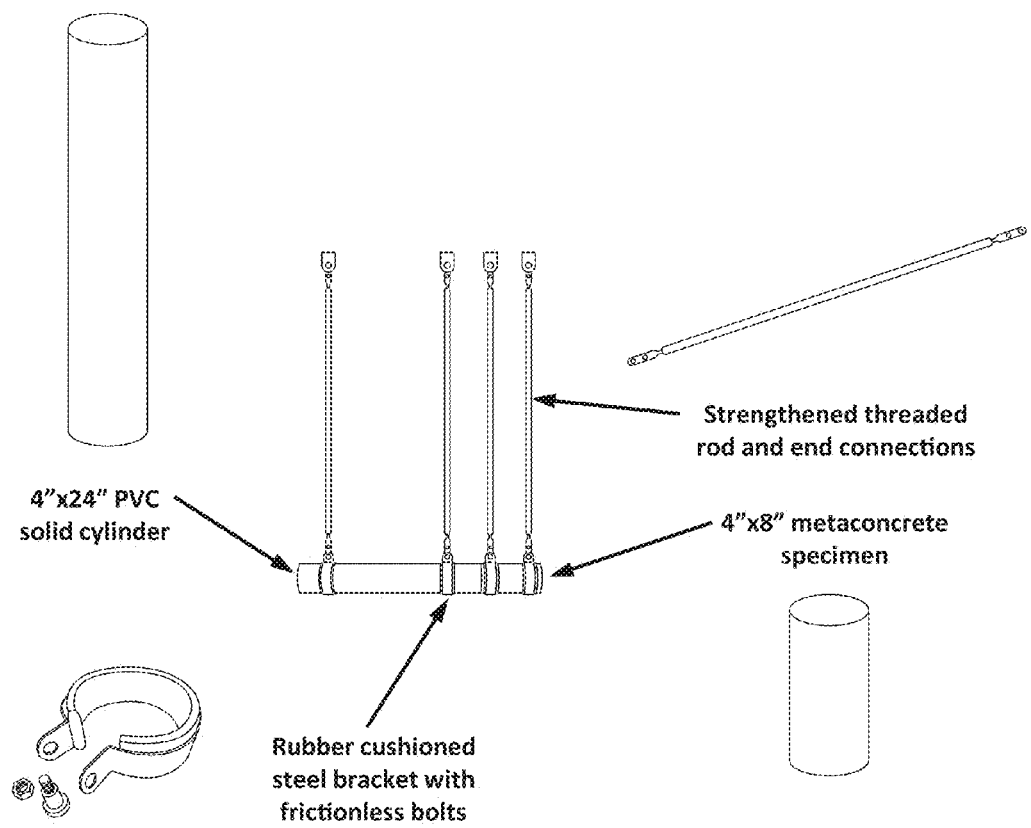
FIG. 15 provides images of an experimental set-up for a pendulum-like test apparatus in accordance with embodiments of the invention.

A schematic of the experimental setup is shown in FIG. 15. The striker and specimen are hung from a fixed suspended beam using steel strengthened threaded rods and rubber cushioned steel brackets. Each of the rotating connections uses a frictionless bolt to minimize energy losses. A felt pad is used on the impact face between the striker and the specimen to help with alignment of the two cylinders during impact. A system of rulers and lasers is used to record the vertical heights reached by the specimen and the striker, and each run of the experiment is recorded on a video camera. The results from this experiment will provide useful understanding of the impact behavior of concrete metamaterial slabs and will also allow for insight into the manufacturing processes required for the use of concrete metamaterial as a specialist construction material.

From these combined studies it is apparent that the characteristics of concrete metamaterials make them suitable for structural applications where dynamic loading is expected. Examples include explosive blast shielding structures, protective slabs against impacts, and tuned damping foundations to mitigate seismic actions in buildings. The potential ease of construction, durability, and comparatively low cost of the resonant aggregates also indicates that concrete metamaterial will be a useful alternative to traditional concrete for dynamic loading applications Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A structural metamaterial comprising:
   a matrix formed of a cement compatible mortar matrix material having a matrix density; and
   a plurality of engineered aggregates each formed of a geometric multilayer body disposed within the matrix material, each geometric multilayer body comprising at least an inner core surrounded by at least one polymeric compliant layer, wherein the inner core is formed of a metallic core material having a core density of at least 7000 kg/m³ and selected from the group consisting of steel, tin, brass, nickel, iron, lead, gold, and tungsten carbide, and wherein the compliant layer is formed of at least one compliant material selected from the group consisting of silicone, rubber, polyethylene, polypropylene, polystyrene, nylon, and urea formaldehyde, and having a compliant layer density that is lower than both the matrix density and the core density, and an elastic modulus that is less than both the matrix elastic modulus and the core elastic modulus and at least $10^{-1}$ GPa, adapted to induce a kinetic oscillation in the inner core when exposed to an energy wave that imparts mechanical energy to the geometric multilayer body within at least one target frequency range, such that the engineered aggregate exhibits a negative effective mass to trap at least a portion of the mechanical energy within the engineered aggregate such that the stress experienced by the surrounding matrix material is reduced; and
   wherein the plurality of engineered aggregates are randomly disposed within the matrix in a mixture.

2. The metamaterial of claim 1, wherein the plurality of engineered aggregates are spherical.

3. The metamaterial of claim 1, wherein the core material is lead.

4. The metamaterial of claim 1, wherein the core material has a density of at least 10000 kg/m³.

5. The metamaterial of claim 1, wherein the compliant material is urea polyurethane.

6. The metamaterial of claim 1, wherein the compliant material has an elastic modulus of at least 1 GPa.

7. The metamaterial of claim 1, wherein the core material is lead, the matrix material is mortar, and the compliant material is nylon.

8. The metamaterial of claim 1, further comprising at least one outer protective layer disposed atop the compliant coating.

9. The metamaterial of claim 1, wherein the target frequency at which each of the geometric multilayer bodies exhibit negative effective mass is dependent on the elastic modulus of the compliant material and the size of the geometric multilayer body in accordance with the following expression:

$$\omega^2 = \frac{3}{2} \frac{E_s}{R_l t \rho_l}$$

where $E_s$ is the elastic modulus of the compliant material, $R_I$ is the radius of the inner core, t is the thickness of the compliant layer, $\rho_I$ is the density of the core material and co is the target frequency.

10. The metamaterial of claim 1, wherein at least two different types of engineered aggregates are disposed within the matrix, each type of engineered aggregate being adapted to induce a kinetic oscillation in the inner cores at a different target frequency range.

11. The metamaterial of claim 1, wherein the concentration of plurality of engineered aggregates disposed within the matrix is at saturation.

12. The metamaterial of claim 1, wherein the plurality of engineered aggregates are adapted to induce a kinetic oscillation at a target frequency characteristic of at least one energy wave type selected from the group consisting of seismic waves, blast waves, and aircraft vibration waves.

* * * * *